US010981512B2

(12) United States Patent
Crandall

(10) Patent No.: US 10,981,512 B2
(45) Date of Patent: Apr. 20, 2021

(54) EXTRUDED SUPPORT MEMBERS FOR FACILITATING ACCESS TO A VEHICLE AND RELATED METHODS

(71) Applicant: Robert Crandall, Yorba Linda, CA (US)

(72) Inventor: Robert Crandall, Yorba Linda, CA (US)

(*) Notice: Subject to any disclaimer, the term of this patent is extended or adjusted under 35 U.S.C. 154(b) by 125 days.

(21) Appl. No.: 16/059,997

(22) Filed: Aug. 9, 2018

(65) Prior Publication Data

US 2019/0047477 A1 Feb. 14, 2019

Related U.S. Application Data

(60) Provisional application No. 62/544,515, filed on Aug. 11, 2017, provisional application No. 62/578,651, filed on Oct. 30, 2017, provisional application No. 62/580,382, filed on Nov. 1, 2017.

(51) Int. Cl.
*B60R 3/00* (2006.01)
*B60Q 1/32* (2006.01)
*B60Q 1/26* (2006.01)
*B60R 13/04* (2006.01)

(52) U.S. Cl.
CPC .......... *B60R 3/002* (2013.01); *B60Q 1/2661* (2013.01); *B60Q 1/323* (2013.01); *B60R 2013/046* (2013.01); *B60Y 2200/141* (2013.01)

(58) Field of Classification Search
CPC . B60R 3/002; B60R 2013/046; B60Q 1/2661; B60Q 1/323; B60Y 2200/141
See application file for complete search history.

(56) References Cited

U.S. PATENT DOCUMENTS

| 2,559,123 | A | 7/1951 | Jackson |
| 3,862,670 | A | 1/1975 | Hovey |
| 4,200,303 | A | 4/1980 | Kelly |
| 4,333,547 | A | 6/1982 | Johansson |
| D292,904 | S | 11/1987 | Bielby |
| 4,935,638 | A | 6/1990 | Straka |
| 5,046,582 | A | 9/1991 | Albrecht |
| D340,905 | S | 11/1993 | Orth, Sr. et al. |
| 5,732,996 | A | 3/1998 | Graffy et al. |
| 5,895,064 | A | 4/1999 | Laubach |
| 6,435,534 | B1 | 8/2002 | Stone |
| D474,435 | S | 5/2003 | Lund et al. |
| 6,588,783 | B2 | 7/2003 | Fichter |

(Continued)

FOREIGN PATENT DOCUMENTS

EP 0210465 2/1987

OTHER PUBLICATIONS

Photograph showing an Off-Road Accessory 'N-Fab A Step Above . . .'; Specialty Equipment Market Association (SEMA) Show; Las Vegas, Nevada; Oct. 30, 2012.

*Primary Examiner* — Darlene P Condra
(74) *Attorney, Agent, or Firm* — Klein, O'Neill & Singh, LLP

(57) ABSTRACT

Support devices and their components are disclosed. The support device facilitates access to a vehicle and includes an elongate support member, brackets for mounting the elongate support member to a vehicle, and a step affixed to the elongate support member. The step can be movable relative to the support member after fastening the step to the support member.

22 Claims, 25 Drawing Sheets

(56) References Cited

U.S. PATENT DOCUMENTS

| | | |
|---|---|---|
| 6,641,158 B2 | 11/2003 | Leitner |
| 6,709,137 B1 | 3/2004 | Glovak et al. |
| 6,830,257 B2 | 12/2004 | Leitner |
| 6,834,875 B2 | 12/2004 | Leitner et al. |
| 6,874,801 B2 | 4/2005 | Fichter |
| 7,007,961 B2 | 3/2006 | Leitner et al. |
| 7,055,839 B2 | 6/2006 | Leitner |
| D535,928 S | 1/2007 | Crandall |
| D546,745 S | 7/2007 | Storer |
| 7,287,770 B2 | 10/2007 | Drabant et al. |
| D567,729 S | 4/2008 | Crandall |
| 7,360,779 B2 | 4/2008 | Crandall |
| 7,398,985 B2 | 7/2008 | Leitner et al. |
| 7,413,204 B2 | 8/2008 | Leitner |
| 7,416,202 B2 | 8/2008 | Fichter |
| 7,434,825 B2 * | 10/2008 | Williams ............... B60R 3/02 280/163 |
| 7,566,064 B2 | 7/2009 | Leitner et al. |
| 7,584,975 B2 | 9/2009 | Leitner |
| 7,717,444 B2 | 5/2010 | Fichter |
| 7,909,344 B1 | 3/2011 | Bundy |
| 7,946,604 B2 | 5/2011 | Crandall |
| 8,152,187 B1 | 4/2012 | Crandall |
| 8,157,277 B2 | 4/2012 | Leitner et al. |
| D665,713 S | 8/2012 | Pochurek et al. |
| D671,874 S | 12/2012 | Kekich, Jr. et al. |
| 8,408,571 B2 | 4/2013 | Leitner et al. |
| 8,448,968 B1 | 5/2013 | Grote et al. |
| 8,641,068 B1 | 2/2014 | Bundy |
| 8,702,284 B2 | 4/2014 | Huang-Tsai |
| 8,827,293 B1 | 9/2014 | Bundy |
| 8,844,957 B2 | 9/2014 | Leitner et al. |
| 9,096,176 B2 | 8/2015 | Muhe-Sturm et al. |
| 9,302,626 B2 | 4/2016 | Leitner et al. |
| D757,622 S | 5/2016 | Wolf |
| 9,561,751 B2 | 7/2017 | Leitner et al. |
| 10,053,017 B2 | 8/2018 | Leitner et al. |
| 10,556,560 B2 * | 2/2020 | Rife ....................... B60R 19/42 |
| 2007/0290475 A1 | 12/2007 | Reitinger |
| 2012/0104718 A1 | 5/2012 | Alvarez et al. |
| 2012/0228848 A1 * | 9/2012 | Fichter .................... B60R 3/00 280/163 |
| 2013/0221632 A1 | 8/2013 | Higgs et al. |
| 2015/0175059 A1 | 6/2015 | Dellock et al. |
| 2015/0183376 A1 | 7/2015 | Fichter |
| 2016/0059774 A1 * | 3/2016 | Crandall ............... B60Q 1/323 280/164.1 |
| 2016/0288718 A1 * | 10/2016 | Hayes ..................... B60R 3/02 |
| 2016/0355138 A1 * | 12/2016 | Smith .................... B60R 19/42 |

* cited by examiner

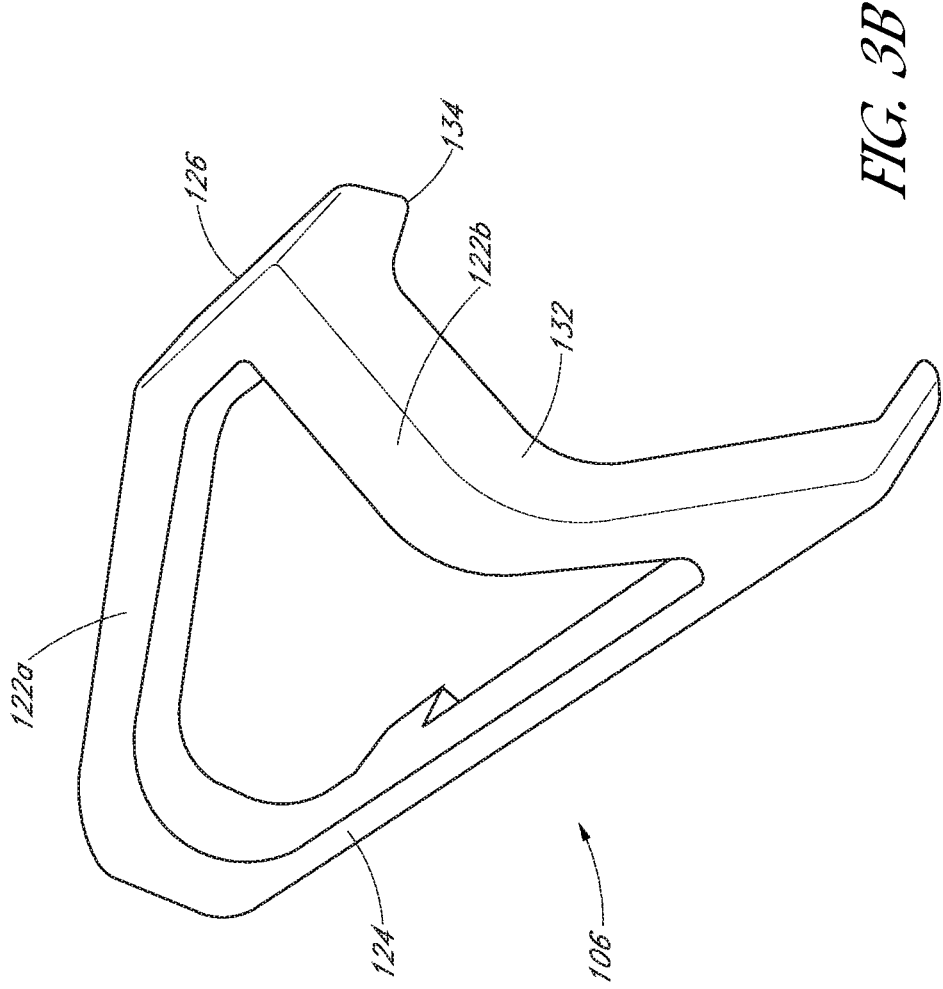

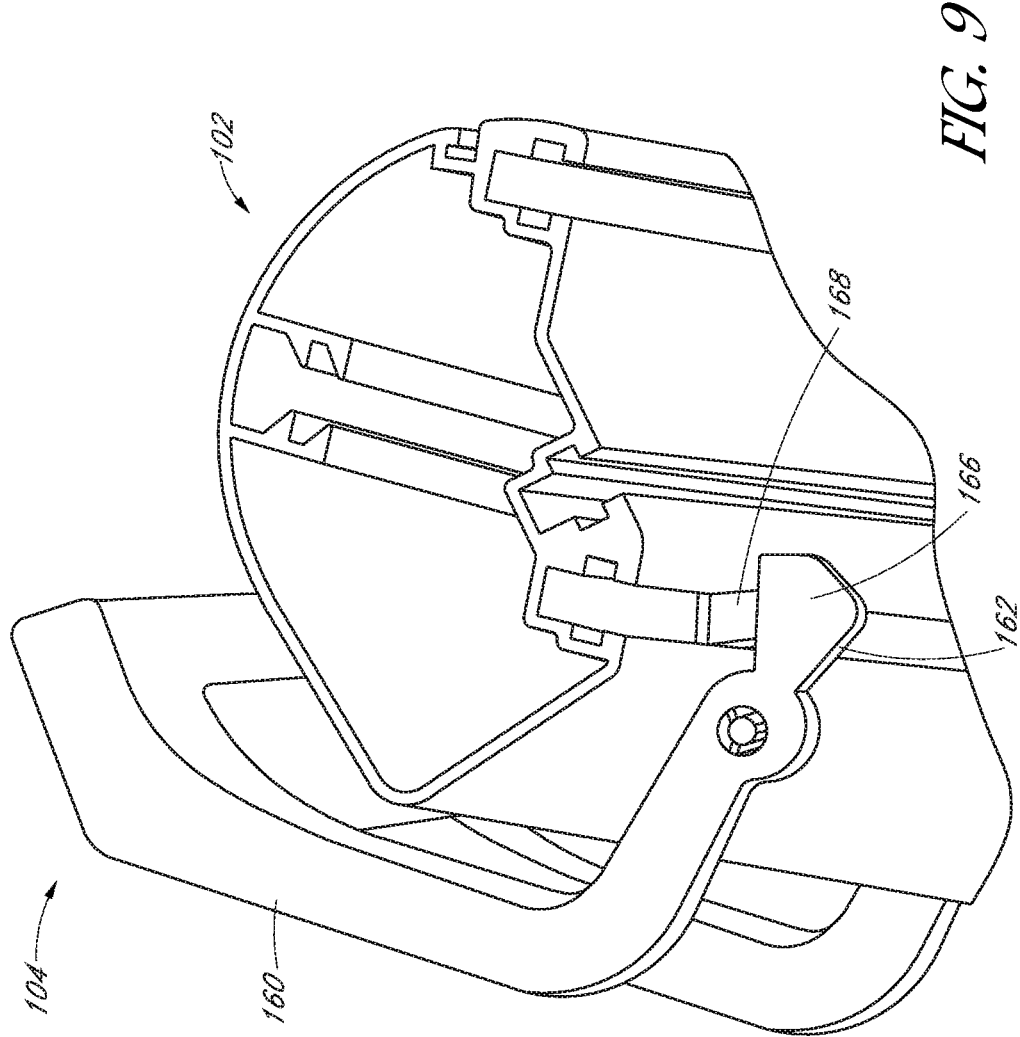

(BACK)

(FRONT)

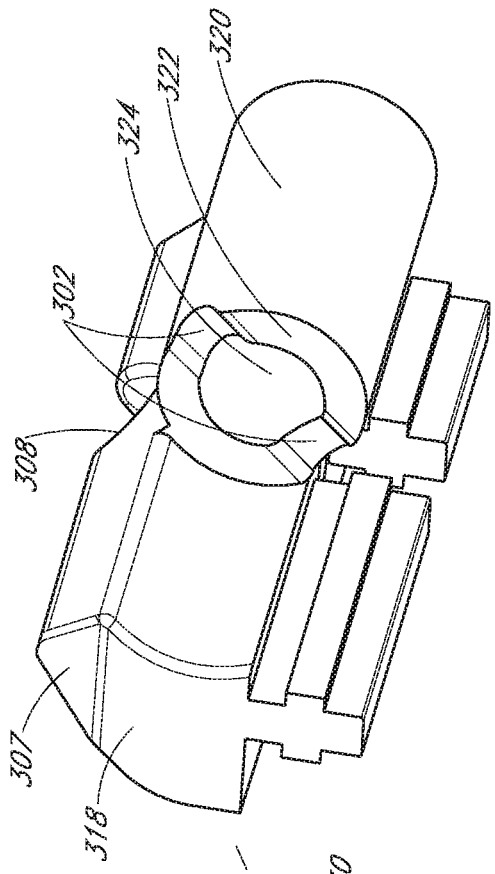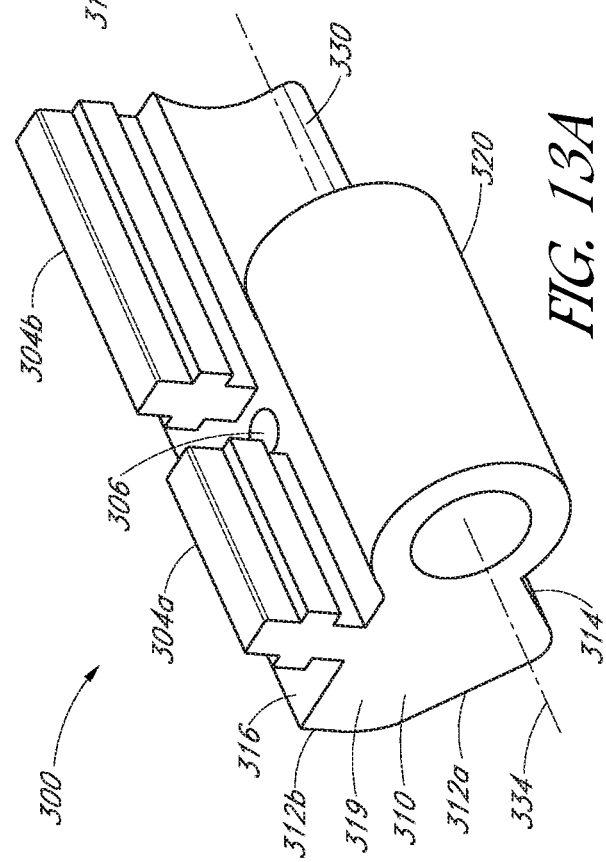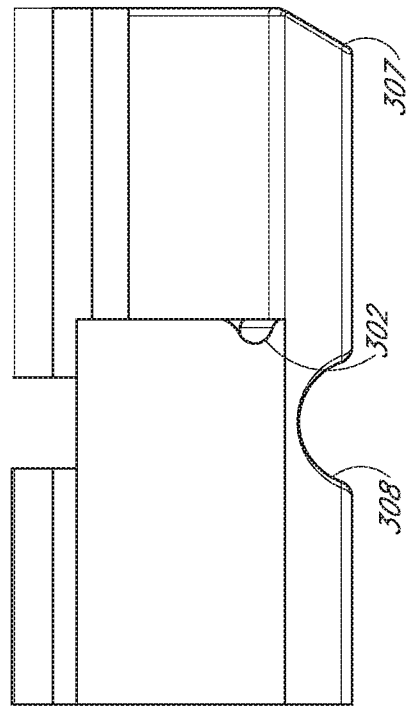
FIG. 13A
FIG. 13B
FIG. 13C
FIG. 13D

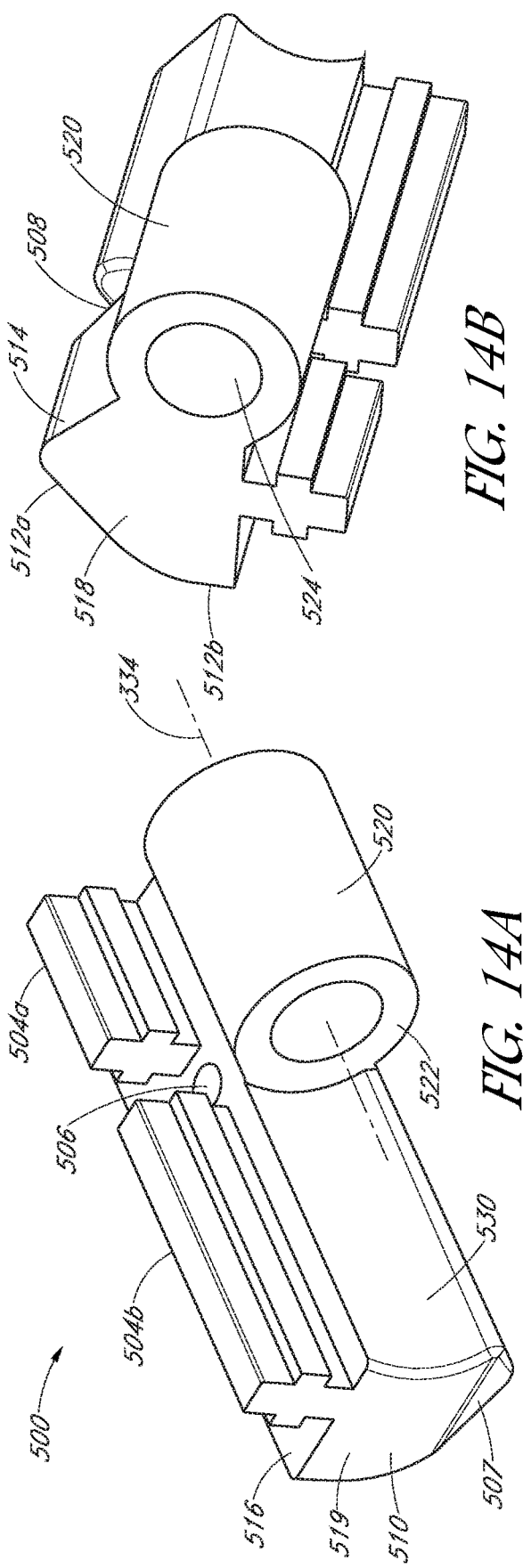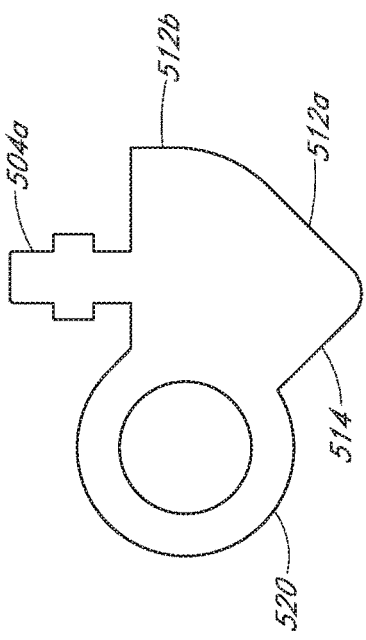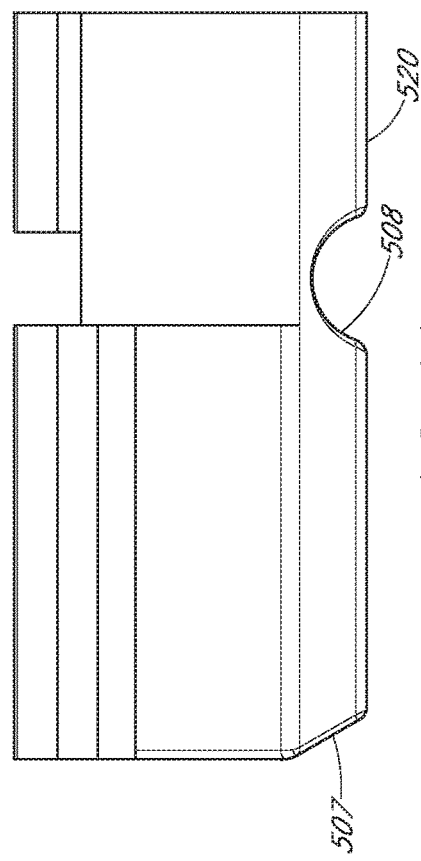
FIG. 14A
FIG. 14B
FIG. 14C
FIG. 14D

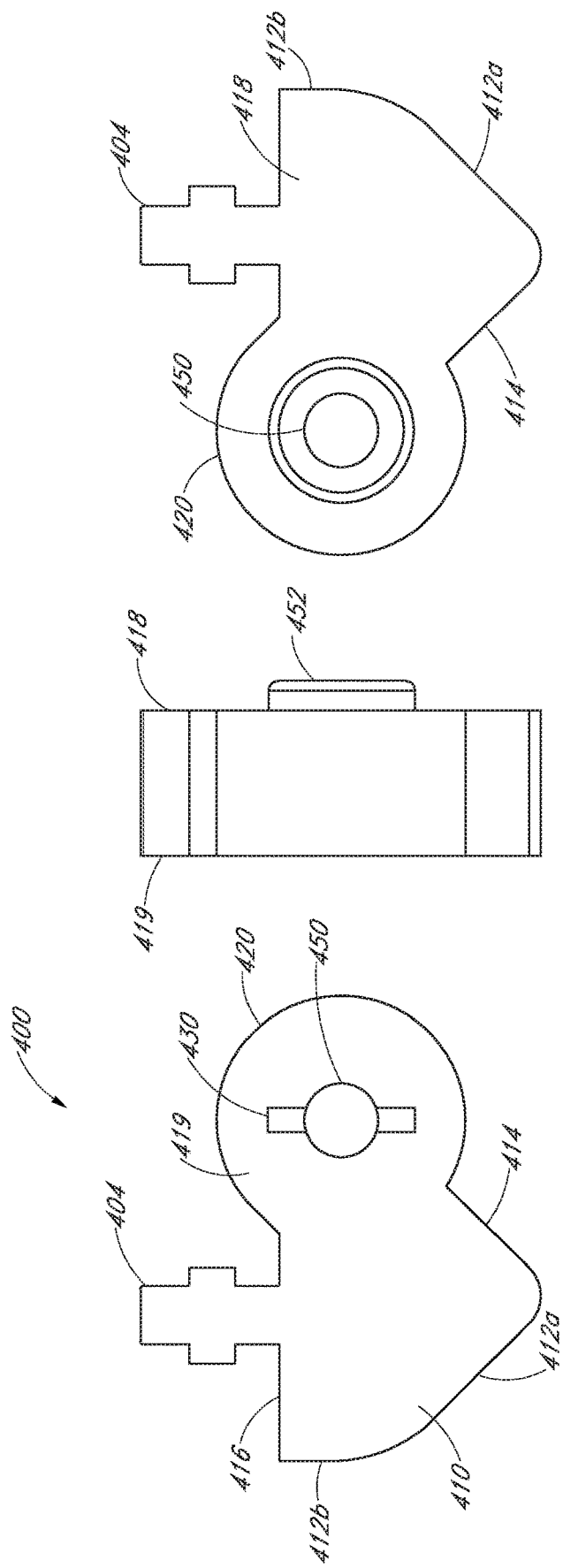

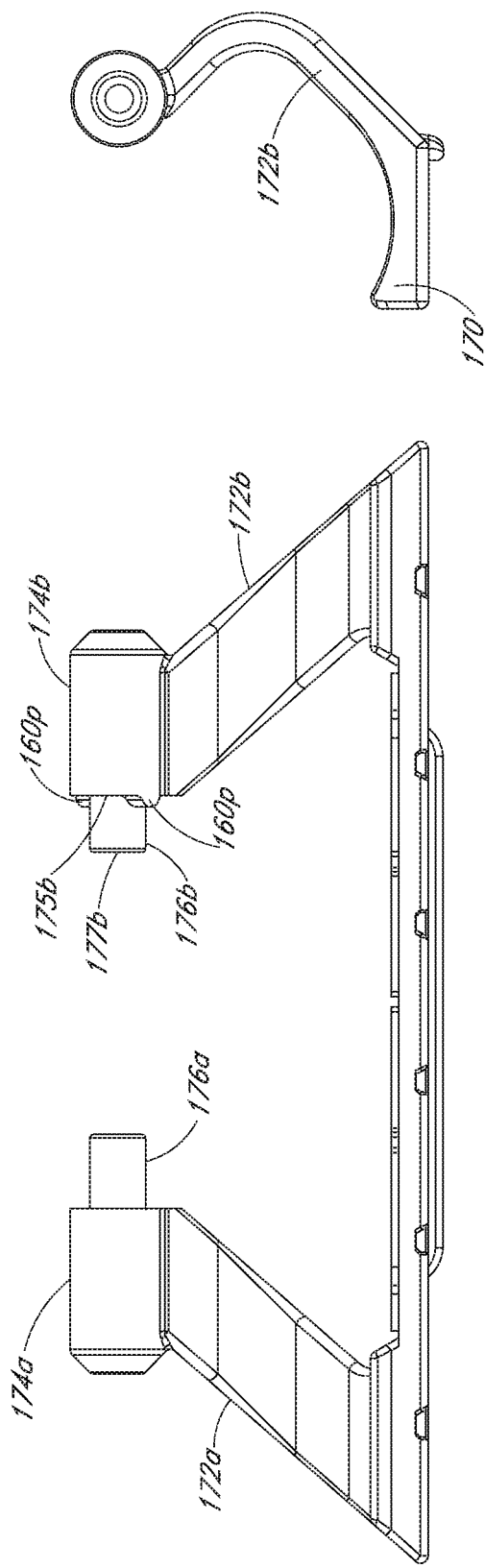
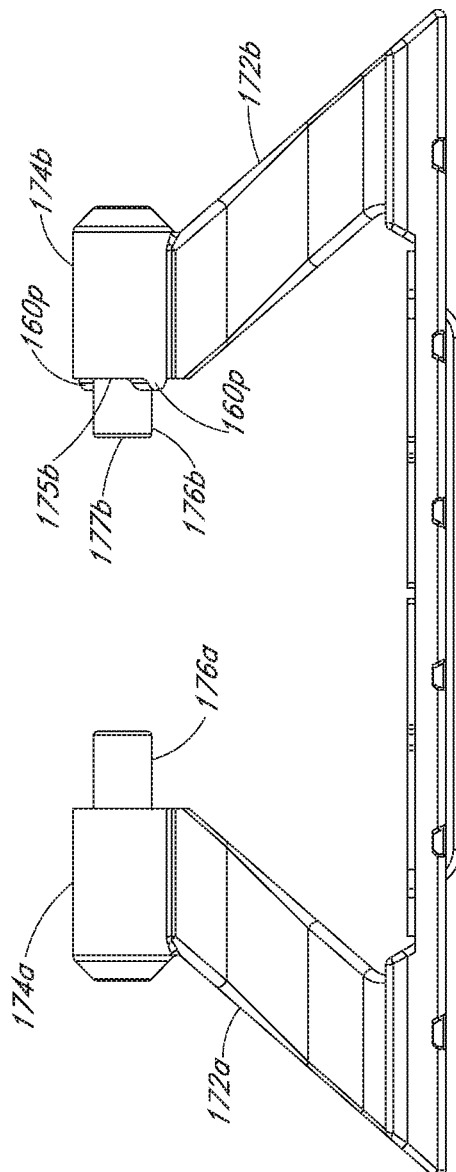
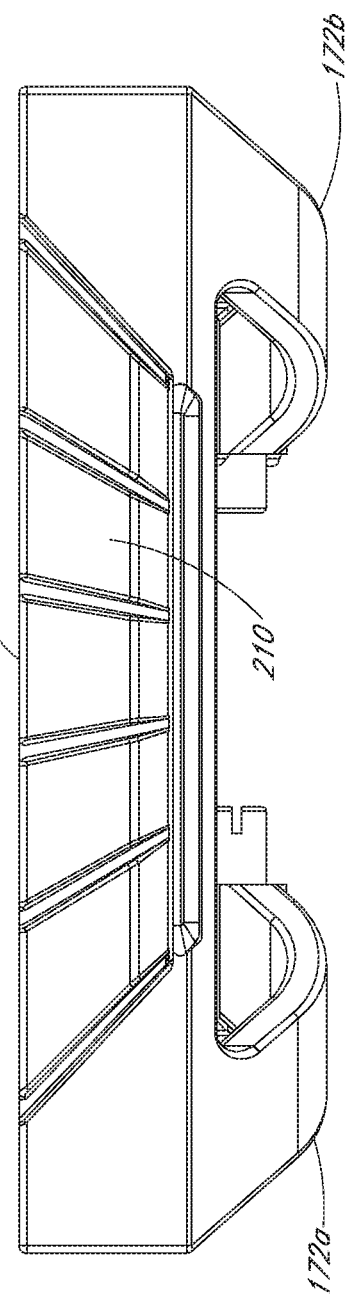
FIG. 16B
FIG. 16D
FIG. 16C

EXTRUDED SUPPORT MEMBERS FOR FACILITATING ACCESS TO A VEHICLE AND RELATED METHODS

FIELD OF ART

The field of the invention relates to systems and methods for facilitating entry and exit from a vehicle with adjustable steps.

BACKGROUND

Vehicles provide transportation for people and objects over distances. While many vehicles are low to the ground or have otherwise easily accessible passenger compartments, some do not and entry and exit may present a challenge. Typical examples of vehicles with more difficult access to passenger compartments include pickup trucks, sport-utility vehicles, off-road vehicles, "raised" or "lifted" automobiles and others. In these types of vehicles, the passenger compartment or compartments may be located at a height which makes entry and exit challenging for children, the elderly or infirm and even normal abled-body adults.

Various solutions are available for addressing the problem of easy access to a passenger's compartment including the use of running boards, attached step-ladders, handles to assist a passenger in pulling themselves up and others. However, existing solutions still have many drawbacks. These drawbacks include twisting from applied weight, capturing dirt and other debris, inability to adjust the mounting position, and difficulty or impossibility of modification or removal.

SUMMARY

Support assemblies, otherwise known or referred to as running boards, for use with vehicles to assist passengers and riders to enter and exit the vehicles. The support assemblies have surfaces that can support a person's feet and weight during ingress and egress from a vehicle.

An exemplary support assembly or running board has an elongated support member that is attached to a vehicle via one or more brackets. One or more steps can then be added or secured to the support member. The one or more steps can be positionable and attachable at different points along the length of the support member. This provides the user with the ability to adjust the locations of the one or more steps so that they are properly positioned for use by riders and passengers of the vehicles.

Each step can have at least two parts including a first step part and a second step part. The first step part can be rotatable relative to the second step part. The second step part can attach to the support member and can be repositionable along the length of the support member.

The first step part that is rotatable can have a step platform for stepping on that can be rotated to be positioned over or above an upper surface of the support member, such as when rotated to the folded over position. However, upon rotating the first step part to an extended position, the step platform of the first step part can be located below the upper surface of the support member. The step platform can also be located below a lower surface of the support member in the extended position.

One or more decorative covers can be positioned on the support member adjacent to but spaced from a step. The decorative covers can have similar shapes as the first step part of the step. The decorative covers can be positionable and attachable at different points along the length of the support member. The decorative covers can provide aesthetic appeal as well as be configured for load bearing.

Each step can have a projection for sliding engagement with a corresponding groove or channel on the support member to permit sliding and engagement.

Aspects of the present invention further include a support device for facilitating access to vehicles comprising: an elongate support member comprising a length; brackets for mounting the elongate support member to a vehicle; a step affixed to the elongate extruded support member; wherein the step has at least a first step part and a second step part; wherein the step is movable along the length of the elongate support member; and wherein the first step part is movable relative to the second step part after the step is fastened to the elongate support member.

A decorative cover can attach to the elongated support member, said decorative cover can be positionable along the length of the elongated support member.

The decorative cover can have a top leg and a lower leg that is longer than the top leg. When attached to the support member, the top leg can be arranged to be above, elevation wise, the bottom leg.

The step platform of the first step part can have a length that is longer than the length of the second step part. When in the folded over position, the step platform, with the relatively longer length, can be arranged to be above, elevation wise, the second step.

When a decorative cover is located adjacent a step and the step is in the folded over position, the step member with the longer length compared to the second step part can be positioned generally along the same elevation as the top leg, which has a relatively shorter length than the bottom leg.

An end cap can attach to an end of the elongated support member. In an example, the support member can have two open ends and two end caps can be incorporated to cover the two open ends of the support member.

The decorative cover can be made from a plastic material. The support member can be made from extruded aluminum.

The decorative cover can be made by printing using a 3D printer. The printed end cap can include a recessed area with a surface and the surface can be plain or can include decorative text, surface designs, numbers, or combinations thereof.

Aspects of the present invention further include a method for manufacturing a support device for use to access a vehicle comprising: obtaining a support member comprising a length; attaching brackets to the support member so that the support member can attach to a vehicle through the brackets; securing a step to the support member to prevent relative movement with the support member along the length of the support member; and wherein the step is rotatable relative to the support member to move from a first folded positon to a second extended position.

The method can include mounting a decorative cover adjacent the step.

The step can comprise a first step part and a second step part, and wherein the first step part is movable relative to the second step part.

The method comprise mounting one or more light elements to the step.

The method can further comprise mounting one or more light elements to the first step part, such as to the step platform of the first step part.

Another aspect of the present invention can include a method of adjusting a support device comprising: moving a step along a length of a support member and fastening the step to the support member; moving a decorative cover along the length of the support member, spacing the decorative cover from the step, and fastening the decorative cover to the support member; and rotating the step relative to the support member.

A still yet further aspect of the invention includes a support device to provide a step for access to a vehicle comprising: a support member attached to the vehicle; a hinge mount assembly attached to the support member; and a step rotatably attached to the hinge mount assembly; wherein the step is rotatable around an axis of rotation between at least two positions.

The hinge mount assembly can comprise a spring that biases the step in a direction along the axis of rotation.

One of the hinge mount assembly and the step can comprise a detent and the other one of the hinge mount assembly and the step can comprise a corresponding protrusion, the detent and the protrusion being to prevent rotation of the step relative to the hinge mount assembly when the spring is biasing the step.

The hinge mount assembly can comprise a first step hinge and a second step hinge.

The hinge mount assembly can further comprise a center hinge spacer. The center hinge spacer can be located between the first step hinge and a second step hinge.

The first and second step hinges can each include a body with a projection. The projection can have a T-slot rail. The T-slot rail can engage a corresponding groove or channel on a support member to allow the second step part, and therefore the step, to attach to the support member.

A spring can be positioned inside the first step hinge. The spring can bias the detent and protrusion on the first and second step hinges to engage. The engagement of the detent and protrusion can be separate by generating a force that is opposite the biasing force of the spring. In an example, the negative force can be generated by merely rotating the first step part about the second step part. In other examples, the negative force can be generated by sliding the first step part relative to the second step part prior to rotating the first step part about the second step part.

The step can comprise a first and a second mounting lug, the first mounting lug can couple with the first step hinge and the second mounting lug can couple with the second step hinge.

The detent and the protrusion can disengage when the step is moved in an opposite direction along the axis of rotation than the direction of biasing by the spring.

A further aspect of the invention can include a method of providing a support device to provide a step for access to a vehicle comprising: attaching a support member to the vehicle; attaching a hinge mount assembly to the support member; and attaching a step rotatably to the hinge mount assembly; wherein the step is rotatable around an axis of rotation between at least two positions.

A still further aspect of the invention is a support device for facilitating access to vehicles comprising: an elongate support member comprising a body with a length, a first surface, a second surface, and a third surface; brackets attached to the elongate support member for mounting the elongate support member to a vehicle; a step affixed to the elongate extruded support member, said step comprising a first step part and a second step part; wherein the step is positionable along the length of the elongate support member including anywhere along a length defined by point A to point B, inclusive, of the elongated support member; wherein the first step part and the second step part are rotatable relative to tone another after the step is fastened to the elongate support member; and wherein the length defined by point A to point B is greater than 1 inch.

The first step part can comprise a step platform attached to a first side leg and a second side leg.

The first step part can be rotatable to a folded over position so that the step platform is located above the first surface of the support member and is rotatable to an extended position so that the step platform is located below the first surface.

The step platform can comprise a first surface and an opposed second surface and wherein the first surface is exposed for stepping on when the first step part is in a folded over position and the second surface is exposed for stepping on when the first step part is in an extended position.

The second step part can be located between the first side leg and the second side leg.

Another feature of the present invention is a method for manufacturing a support device for use to access a vehicle comprising: obtaining a support member comprising a body with a length, a first surface, a second surface, and a third surface; attaching brackets to the support member so that the support member can attach to a vehicle through the brackets; securing a step to the support member by sliding the step from a first point to a second point on the support member and then securing the step at the second point; and wherein the step is rotatable relative to the support member to move from a first folded positon to a second extended position.

BRIEF DESCRIPTION OF THE DRAWINGS

These and other features and advantages of the present devices, systems, and methods will become appreciated as the same becomes better understood with reference to the specification, claims and appended drawings wherein:

FIGS. 3A-3D are different views of a decorative cover that is usable with a support member, as shown in FIG. 1.

FIGS. 6-9 are different views of the support device of FIG. 1 shown in various detail views.

FIGS. 13A-D show various views of a right step hinge for the second step part.

FIGS. 14A-D show various views of a left step hinge for the second step part.

FIGS. 15A-C show various views of a center hinge spacer for the second step part.

FIGS. 16A-D show various views of a first step part

DETAILED DESCRIPTION

The detailed description set forth below in connection with the appended drawings is intended as a description of the presently preferred embodiments of support members provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
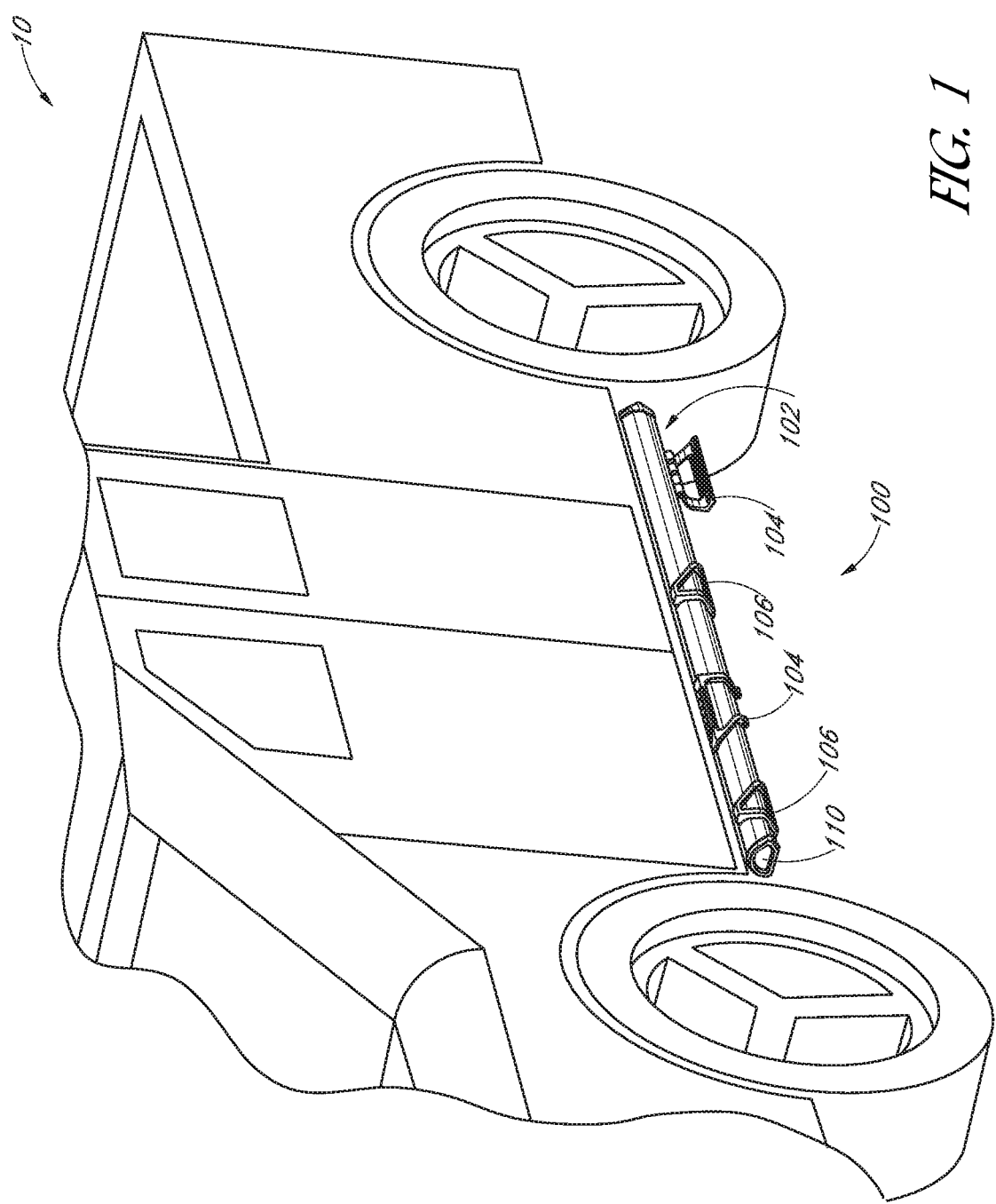
FIG. 1 is a schematic perspective view of a support device or assembly with steps attached to a pickup truck according to an embodiment of the present invention.

FIG. 1 is an exemplary perspective view of a support device or assembly 100 provided in accordance with aspects of the present disclosure mounted to a vehicle 10, such as to a pickup truck, a van or a sport utility vehicle (SUV), to name a few non-limiting examples. In the exemplary embodiment, the support device 100 is provided with an support member 102 comprising one or more steps 104, one or more decorative covers 106, and one or more brackets 108 (FIG. 2) for attaching the support device 100 to the vehicle 10. The number of steps 104 incorporated with the support device or assembly 100 can depend on the number of doors the support device is mounted to, such as a two door truck or a four door SUV. End caps 110 can be provided at the two ends of the support member 102. The support device 100 may be understood or referred to as a running board.

Figure 2:
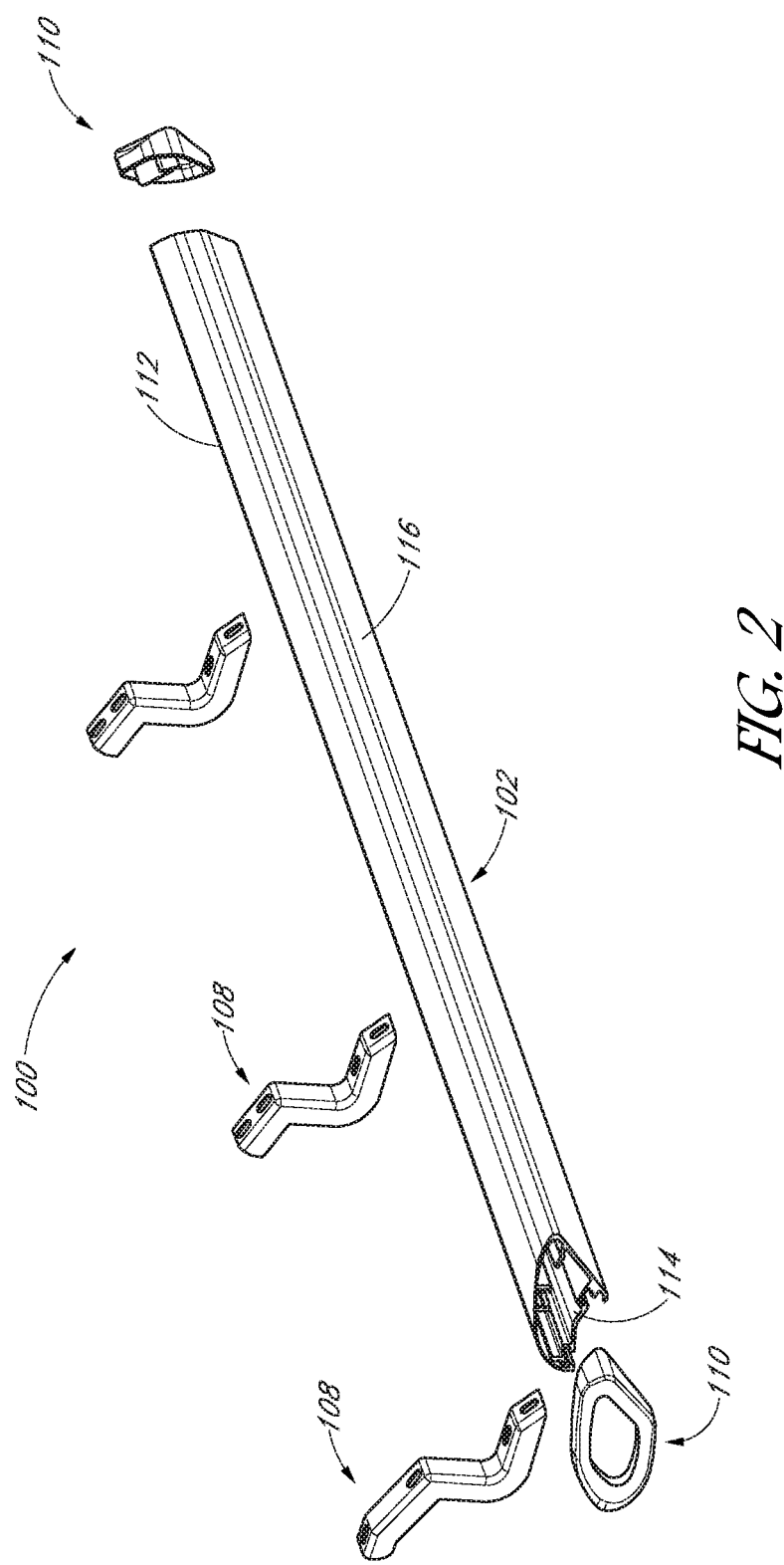
FIG. 2 is an exploded view of the extruded support device of FIG. 1, shown without the steps of decorative covers.

With reference to FIG. 2 and continued reference to FIG. 1, the brackets 108, which can total three, more than three or less than three, are shaped metals attached to the elongated support member 102, such as by welding or using fastening means, such as crews, nuts and bolts, etc., secured to one or more bolt galleys or channels formed with the extruded support member. The brackets 108 can be the same as those disclosed in U.S. Pat. No. 9,333,919, the contents of which are expressly incorporated herein by reference.

Also shown in FIG. 2 are two caps or end caps 110 for mounting to each end of the support member 102. The caps 110 can prevent dust and other build ups from entering the interior of the support member 102. As shown, each cap 110 is configured to frictionally engage the exterior and/or interior of the support member 102 to secure thereto. In some examples, detents, fasteners, such as set screws 240 (FIG. 8), or other securement means may be used to more securely attach the caps to each end of the support member 102. The caps 110 can be made from plastic or cast metal. For example, the caps 110 can be formed by plastic injection molding. In another example, the caps 110 can be printed using a 3D printer using anyone of OBJ, STL, VRML, X3G, PLY, and FBX data files or other current or future file format for 3D printing. Further aspects of the caps 110 are discussed below with reference to FIG. 5.

The steps 104 and the decorative covers 106, as shown in FIG. 1, are both adjustable or slidable along the length of the support member 102 to final positions as desired and then secured to the support member 102 using fasteners or other securing means. For example, the steps 104 can be slid along the length of the support member 102 to correspond to positions adjacent the doors of the vehicle 10 for stepping on and off of the vehicle 10. The decorative covers 106 can be adjusted based on the final positions of the steps 104 or as desired. For example, the decorative covers 106 can be positioned anywhere along the support member 102 relative to the steps 104. Once positioned at the locations desired, the decorative covers 106 can be more permanently secured to the support member, as further discussed below. Although the term "decorative" is used to identify the cover, the cover 106 can be made with durable material with sufficient strength to be load bearing. That is, a user can also stand on the cover 106 when getting in or out of the vehicle.

The number of steps 104 and of the number of decorative covers 106 can be adjusted or selected as desired, such as based on the length of the support member 102, based on personal preference, based on the door locations, or combinations thereof. The steps and the decorative covers can be more permanently secured to the support member 102 using one or more fasteners or fastening means secured to T-slots or bolt galleys, as further discussed below.

The support member 102 has a non-circular shape. As shown, the support member is elongated and has a body or structure with a curved upper surface 112, a lower surface 114, which can be generally flat or slightly arcuate, and a slanted side edge surface 116 depending from the upper surface 112. The three surfaces can instead be referred to as a first surface 112, a second surface 114, and a third surface 116.

The support member 102 can be extruded from aluminum. In an example, the lower surface 114 of the support member can be formed with one or more T-slots or bolt galleys, as further discussed below. Internally of the support member 102, one or more bosses, open rings, or internal bolt galleys can be incorporated for strength and/or to use as anchors for securing other components thereto. In other examples, the support member 102 has a different cross-sectional shape. For example, the support member 102 can be extruded with a polygonal shape, such as a triangular shape, a square shape, a rectangular shape, a hexagonal shape, an octagonal shape, a multi-sided shape, an irregular shape, an oval shape, an even a circular or round shape.

Figure 3A:
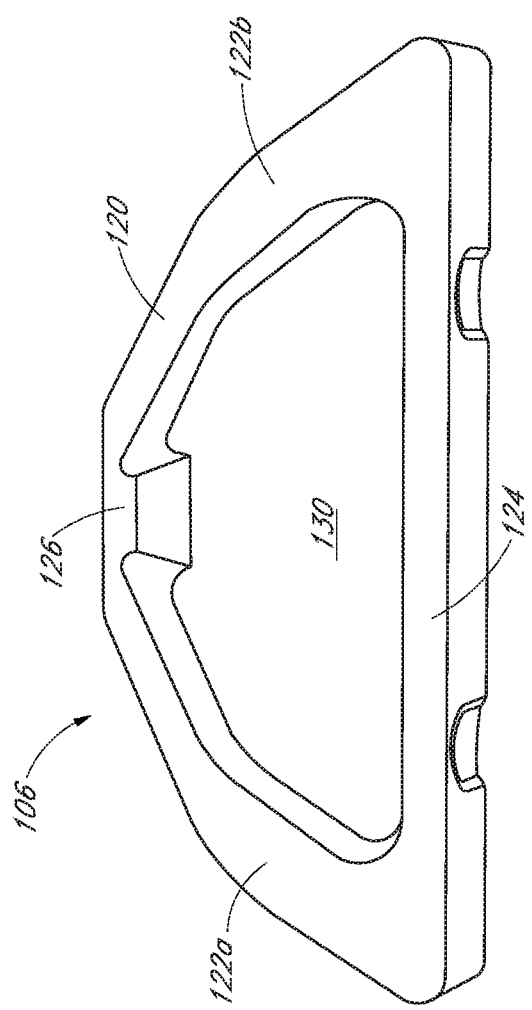
Figure 3C:
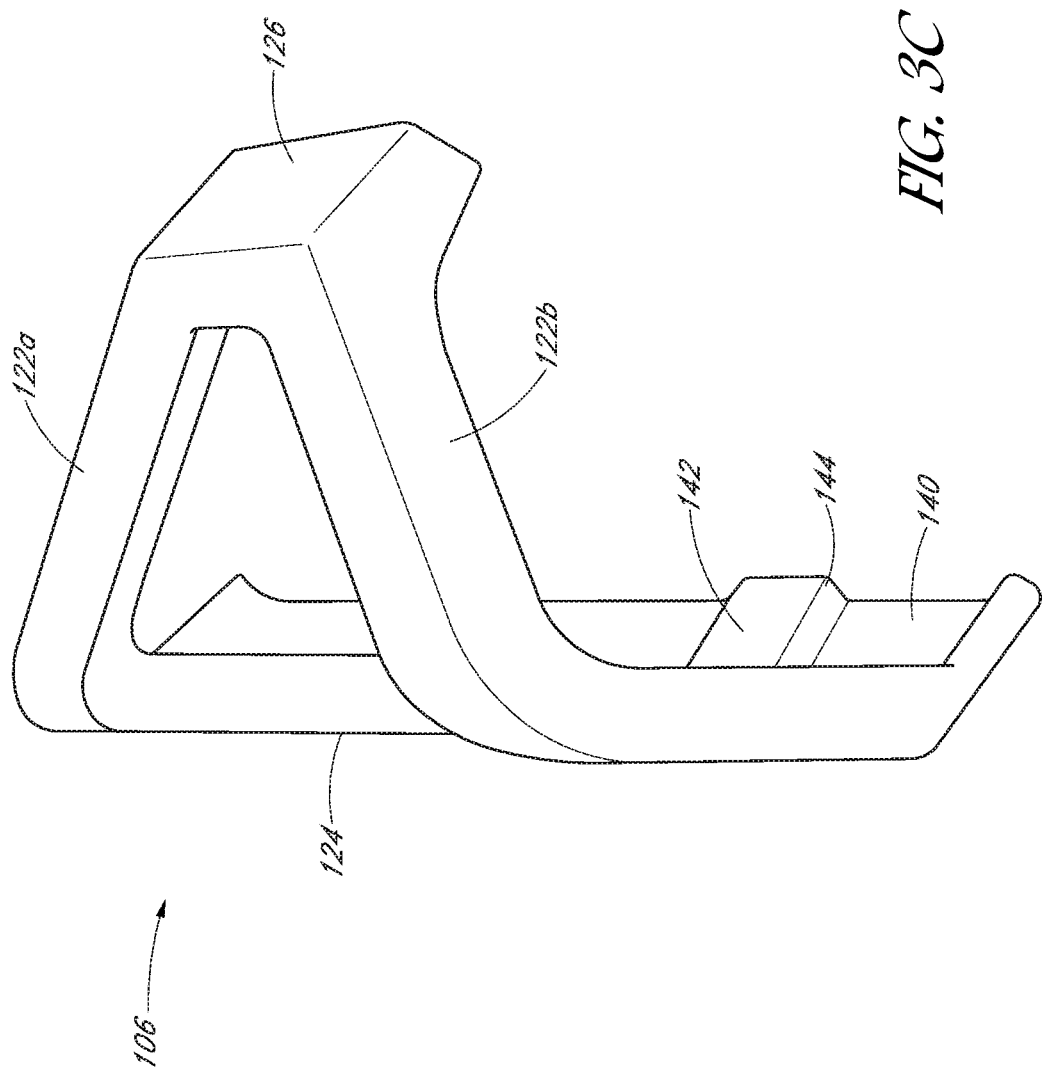
Figure 3D:
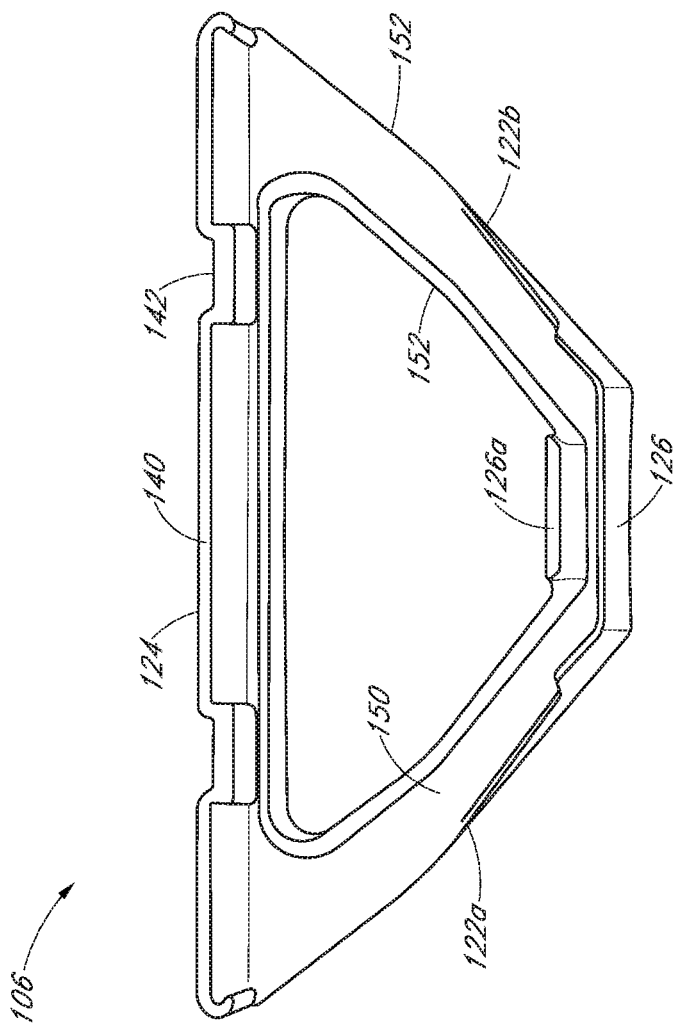
Figure 4:
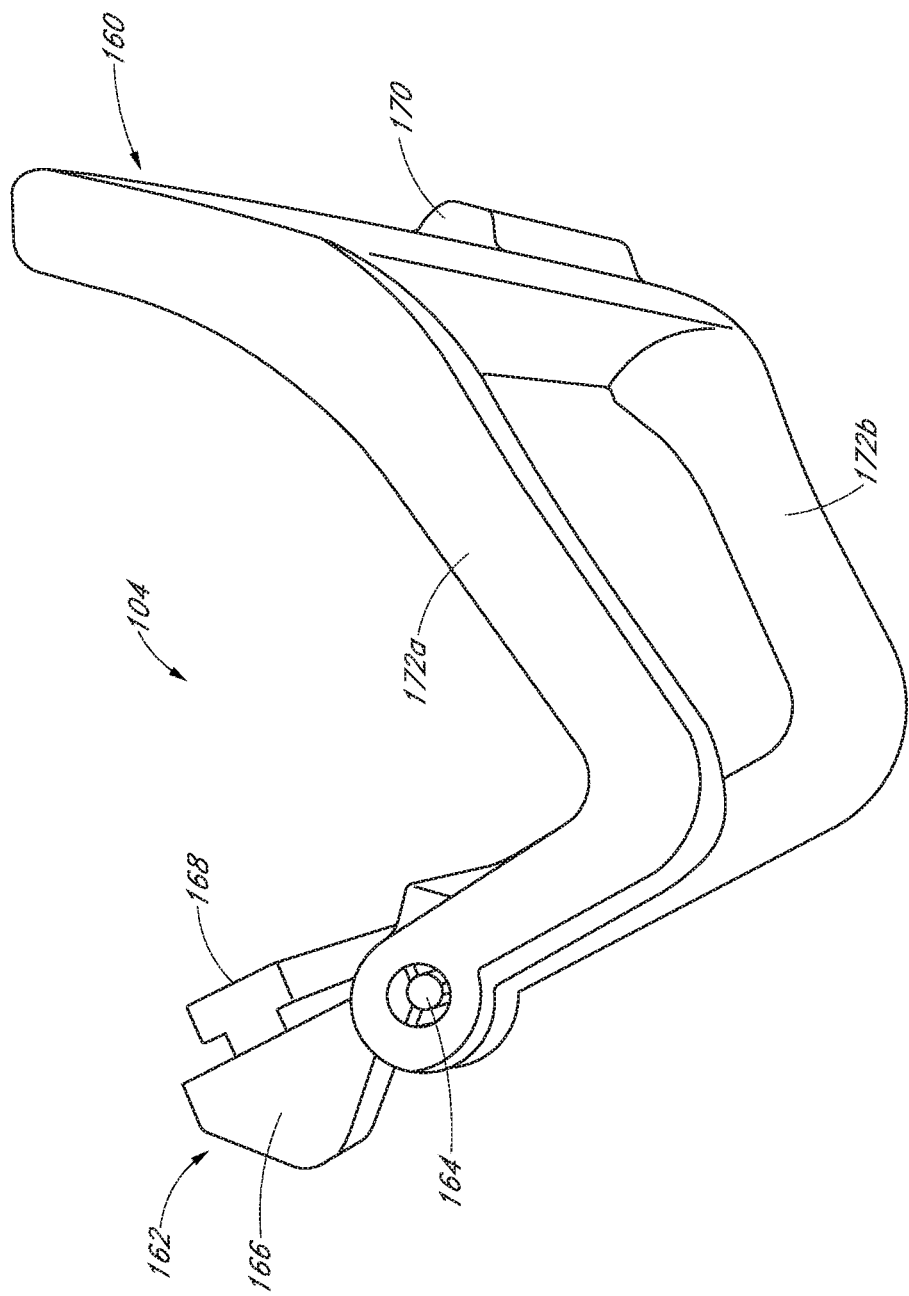
FIG. 4 is a perspective view of a step that is usable with a support member, as shown in FIG. 1.

FIGS. 3A-3D show different views of a decorative cover 106 for use with a support member 102 and FIG. 4 shows a step 104 for use with the support member 102, as shown in FIGS. 1 and 6-8.

With reference now to FIGS. 3A-3D, a decorative cover 106 is shown in various views and orientations. However, other than having a shaped body for mating to the support member 102 and a means for securing the decorative cover 106 to the support member, such as a flange, bosses, securement holes, etc. the overall shape and configuration of the decorative cover 106 are not limited to the embodiment shown and can embody a wide range of shapes and configurations, as further discussed below.

FIG. 3A shows a front elevation view of the decorative cover 106, which has a body 120 comprising a generally triangular frame comprising two vertical legs 122a, 122b, a base leg 124, and a top leg 126. The body 120 has a hollow center 130. The two vertical legs 122a, 122b slant inwardly so that the overall shape of the decorative cover 106 is generally triangular with the base leg 124 being longer than the top leg 126. The various legs may alternatively be referred to as first and second legs 122a, 122b, base leg 124 and top leg 126. As the two vertical legs 122a, 122b are located to the sides of the top leg and base leg, they call alternatively be referred to as side legs. In other examples, the top leg 126 can be omitted and the two vertical legs 122a, 122b slant together and contact one another at the top, resembling more of a triangular shape.

With further reference to FIGS. 3B and 3C in addition to FIG. 3A, the two vertical legs 122a, 122b are both curved to each form a curved inner coupling surface 132, which faces the exterior of the support member 102 when the decorative cover is attached to the support member. The top leg 126 has an inner projection surface 134 that overlays the curved upper surface 112 of the support member 102. The base leg 124 has an extended surface 140 that extends below or subjacent the lower surface 114 of the support member 102 when the decorative cover is attached to the support member. In an example, the extended surface 140 has one or more mounting bosses 142 to enable use of one or more fasteners to fasten the base leg 124, and hence the decorative cover 106, to the T-slot or bolt galley on the lower surface 114 of the support member. An optional reinforced projection 144 can form around each mounting boss 142 to provide added rigidity and strength. In the embodiment shown, two spaced apart mounting bosses 142 are provided on the extended surface 140 with more or fewer mounting bosses contemplated.

FIG. 3D shows a plan view of the decorative cover from an opposite side of FIG. 3A. As shown, the various legs 122a, 122b, 124, and 126 forming the decorative cover 106 are unitarily formed. In an example, the legs are formed with a central wall 150 and one or more sidewalls 152, 154, which can act as ribs to reinforce the central wall 152. The inside sidewall of the top leg 126 can have an inner extended leg portion 126a so that the free ends of the inner extended leg portion and the body of the top leg 126 terminate along about the same position. The decorative cover 106 can be made from a plastic material. For example, the plastic cover 106 can be formed by plastic injection molding. In another example, the plastic cover 106 can be printed using a 3D printer using anyone of OBJ, STL, VRML, X3G, PLY, and FBX data files or other current or future file format for 3D printing.

FIG. 4 is a perspective view of an exemplary step 104 provided in accordance with aspects of the present disclosure. The step 104 is configured to mount onto a support member 102, as shown in FIGS. 1 and 6-8. The step 104 is configured to be movable. In an example, the step 104 has two parts and the two parts are movable relative to one another. The step is also movable relative to the support member. In exemplary embodiments, the step 104 is configured to slide along the length of a support member 102 and movable in a radial direction relative to the length of the support member 102. As further discussed below, a first part of the step 104 can have a first folded position 200 and a second extended position 202 (FIGS. 1 and 6) after moving the first part relative to the second part of the step.

As shown, the step 104 comprises a first step part 160 and a second step part 162 movably connected to one another. In an example, the first step part 160 is rotatable relative to the second step part 162. In some examples, the first step part 160 is slidable and rotatable relative to the second step part 162. The first step part 160 and the second step part 162 can be pivoted relative to one another and can include a cam surface and a cam follower to secure the first step part in the first folded position 200 until an intentional rotational force is applied to rotate the first step part 160 relative to the second step part 162 to move the first step part to the extended position 202 from the folded position.

Additional step components may be incorporated to control the rotational movement of the first step part 160 relative to the second step part 162 with the cam and cam follower. For example, a pin 164 can be included to secure the first step part and the second step part together and enable rotation between the two. Surfaces within the first step part and the second step part can be included to provide the camming function for controlling rotational forces required to move the first step part relative to the second step part in moving from the first folded position to the second extended positon as further discussed below.

In another example, detents or interference can be incorporated to prevent rotation. The interference or detents can be severed by first moving the first step part relative to the second step part against a spring load, such as moving the first step part relative to the second step part along the lengthwise axis of the support member 102 or down the pin 164 to separate the detents or interference. Then the first step part 160 can be rotated relative to the second step part 162 to move the first step part from the first folded position to the second extended position. When so configured, the first step part and the second step part can slide laterally relative to one another, such as to disengage the detents, and rotate relative to one another, such as to move the first step art from a folded position to an extended position or vice-versa.

With reference again to FIG. 4, the second step part 162 can have an elongated body 166 provided with a projection 168 for fitting into a bolt galley of the support member 102. In the embodiment shown, the projection 168 has a T-shape cross-section for fitting into a T-slot or bolt galley on the lower surface 114 of the support member 102, as further discussed below. By sliding the T-shape projection 168 into the correspondingly shaped bolt galley, the second step part 162 can be securely attached to the support member 102. One or more fasteners, such as a bolt and nut combination or a set screw, can then removably fix the elongated body 166 of the second step part 162 to the support member.

The first step part 160 is shown with multiple legs. In an example, the first step part 160 has a first leg 170 and two side legs 172a, 172b, as further shown in FIGS. 6 and 7. The first step part 160, as well as the second step part 162, can be made from a rigid and durable plastic material or from a metal material. Preferably, the first and second step parts 160, 162 are made from an aluminum material, such as from machined aluminum material and/or from cast aluminum with other metallic materials contemplated. In an example, the step 104 is configured to be weight bearing and capable of supporting individuals stepping on and off of the step 104 to enter and exit a vehicle.

In some examples, the first leg 170 of the step 104 can be provided with an array of openings, such as slits or holes, to enable the passage of light to pass thereacross or therethrough. In an example, light elements can be mounted on the first leg 170 to enable light to shine through the array of openings. Further discussions regarding mounting light elements to the step and powering the light elements are described in U.S. Pat. No. 9,333,919, previously incorporated by reference. Optionally, LEDs can be mounted on the two opposed surfaces of the first leg 170 without incorporating openings. The first leg 170 may also be referred to as a step platform.

Figure 6:
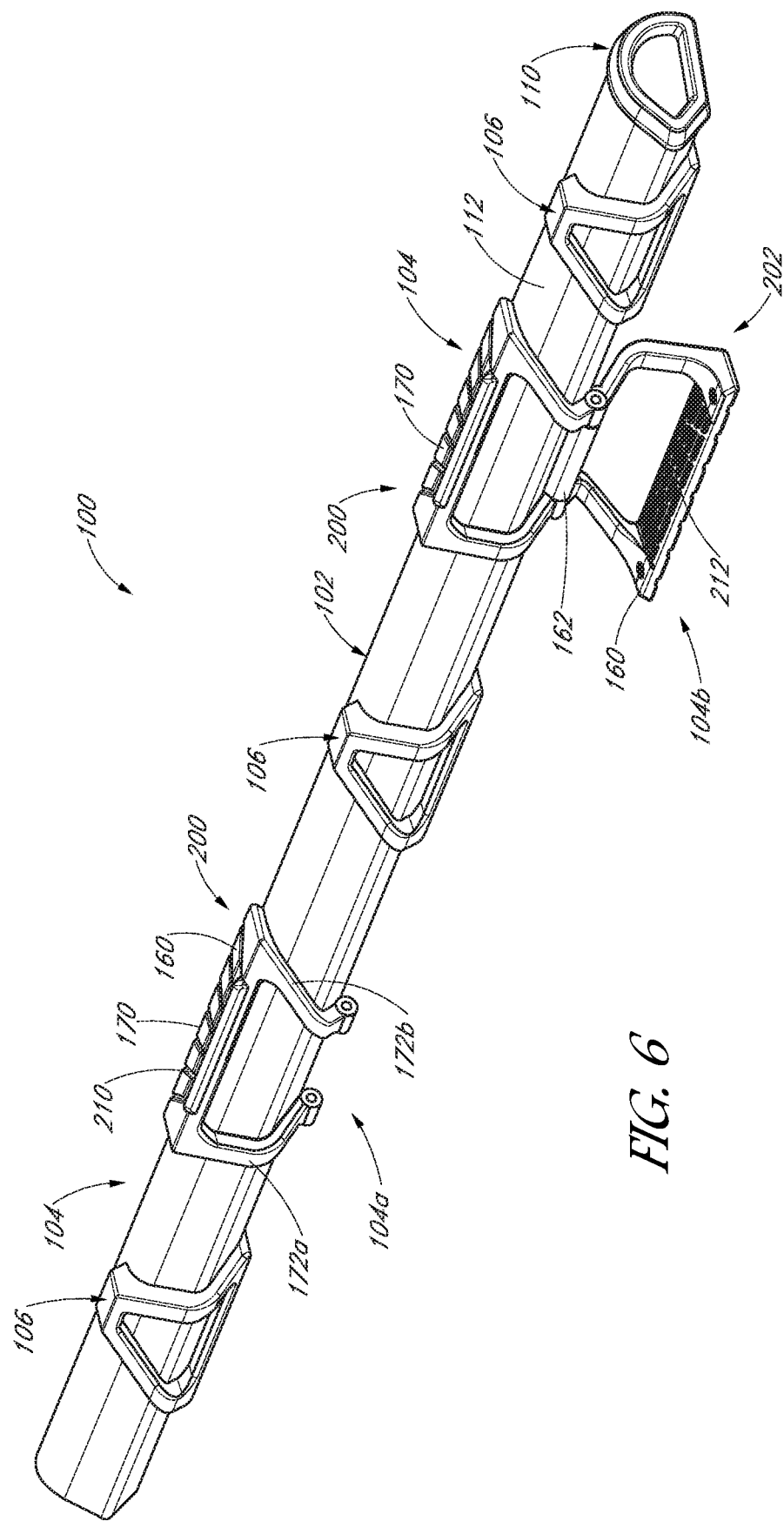

Optional cushion pads may be placed at various locations on the step 104 to prevent dinks, dents, or scratches when the first step part 160 is rotated to fold against the support member 102, as shown in FIG. 1 and FIG. 6.

Figure 5:
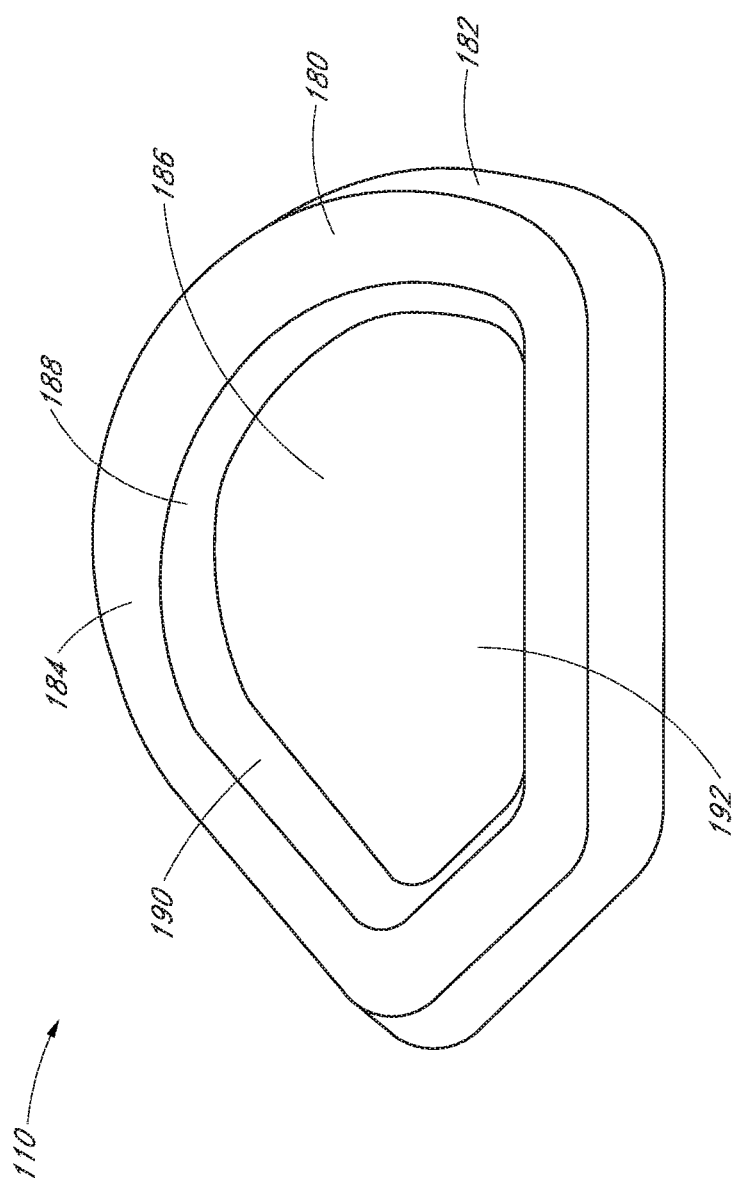
FIG. 5 is an end cap that is usable with a support member, as shown in FIG. 1.

FIG. 5 is an enlarged view of the end cover or cap 110 of FIG. 1. As shown, the cap 110 has a body 180 with a perimeter 182, a first surface 184 exposed or facing away from the support member 102, and an opposed second surface that faces the support member. The first surface 184 has a recessed area 186 bounded by an inner perimeter 188. A bridging wall 190 can connect the inner perimeter 188 and the recessed area 186. The inner perimeter 188 and the outer perimeter 182 can have generally the same shape. When the end cap 110 is located at an end of a support member 102, all or most of the contour of the support member can be located within the outer perimeter 182 of the cap. In an example, the majority of the contour of the support member 102 (FIG. 1) can be located between the outer perimeter 182 and the inner perimeter 188. One or more extended tabs or flanges can be incorporated on the second surface of the cap 110 to facilitate gripping the cap to the support member. The one or more extended tabs on the cap 110 also provide a structure for which one or more fasteners 240 (FIG. 8) can be used to more firmly secure the cap to the support member 102.

In an example, the surface 192 of the recessed area 186 can be a decorative surface. That is, a user can select different designs, colors, surface features, texts, logos, pictures, etc. to print on the surface 192. In some examples, other surfaces of the end cap, in addition or instead of the central surface 192, can be printed with user select designs and colors. In an example, the end cover or cap 110 can be formed by plastic injection molding. In another example, the end cover 110 can be printed using a 3D printer using anyone of OBJ, STL, VRML, X3G, PLY, and FBX data files or other current or future file format for 3D printing. A user can choose to have her name or any number of designs printed directly onto the surface 192 of the recessed area or elsewhere on the cap. In other examples, other surfaces of the decorative cap can be edited to include designs and the cap with the designs printed using a 3D printer. Optionally, the end cap 110 can be made from 3D printing or plastic injection molding and a separate decal or a separate printable plate, with optional designs and colors from 3D printing, can be secured to the end cap using mechanical means, tape, glue, bonding, or combinations thereof.

FIG. 6 is a perspective view of a support device or assembly 100 in accordance with aspects of the present invention, shown removed or spaced from a vehicle. As shown, the support device or running board 100 comprises three decorative covers 106, two steps 104, and two end caps 110 (only one shown), one on each end of the support member 102. In other examples, the support device 100 can have a different number of decorative covers 106 and a different number of steps 104. For example, there can be zero decorative covers and one or more steps 104. In another example, there can be two or more decorative covers 106 and only one step 104. In still other examples, there can be more than three decorative covers 106 and one or more steps 104.

FIG. 6 shows the first step 104a in a first folded position 200 in which the first step part 160 is folded so that the first leg or step platform 170 overlies the curved upper surface 112 of the support member 102. The second step 104b is depicted in both the first folded position 200 or rotated to be in the second extended position 202. Both the first folded position 200 and the rotated second extended position 202 are shown to provide the viewer with a better understanding that the step provided in accordance with the present embodiment has a first step part 160 that is movable relative to a second step part 162 to move between the first folded position 200 and the second extended position 202. The first step part 160 is understood to be positionable in the first folded position or the second folded position but not both at the same time. The first step part 160 is also understood to be movable relative to the support member 102 in moving between the first position and the second position.

As shown and as further discussed below with reference to FIG. 9, the second step parts 162 of the two steps 104 are removably fixed to the support member 102 whereas the first step parts 160 of are the two steps are rotatable relative to the length of the support member when the steps 104, such as when the second step parts 162 of the two steps, are fixed to the support member 102 using one or more fasteners. However, prior to fixing the first step parts 162 to the support member 102, the second step parts 162, including the entire steps 104, are movable, such as being slidable, relative to the support member 102 along the length of the support member.

As shown, the first leg 170 of each of the steps 104 has an enlarged surface area that is sized and shaped to support one or two feet of an individual when that individual uses the step 104 to get in and out of a vehicle. The individual can step on the first leg 170 when the first step part 160 is in the first folded position 200 or in the second extended position 202. In other words, the steps 104 of the present invention are configured to be used in multiple positions, including when in a first folded position or in a second extended position. For example, a tall person can choose to use the steps 104 with the first step parts 160 in the first folded position 200 whereas a relatively shorter person can choose to use the steps with the first step parts 160 in the second extended position 202. In either situation, the user can step onto the same first leg 170 to ingress and egress from the vehicle.

The first leg 170 on each step has a first surface 210 and a second surface 212. One or both surfaces 210, 212 can have traction features, such as bumps or projections, to increase traction between the steps and an individual's feet or shoes. The two side legs 172a, 172a of each step 104 are tapered inwardly and both having a curved body so as to form fit around the body of the elongated support member 102.

Figure 7:
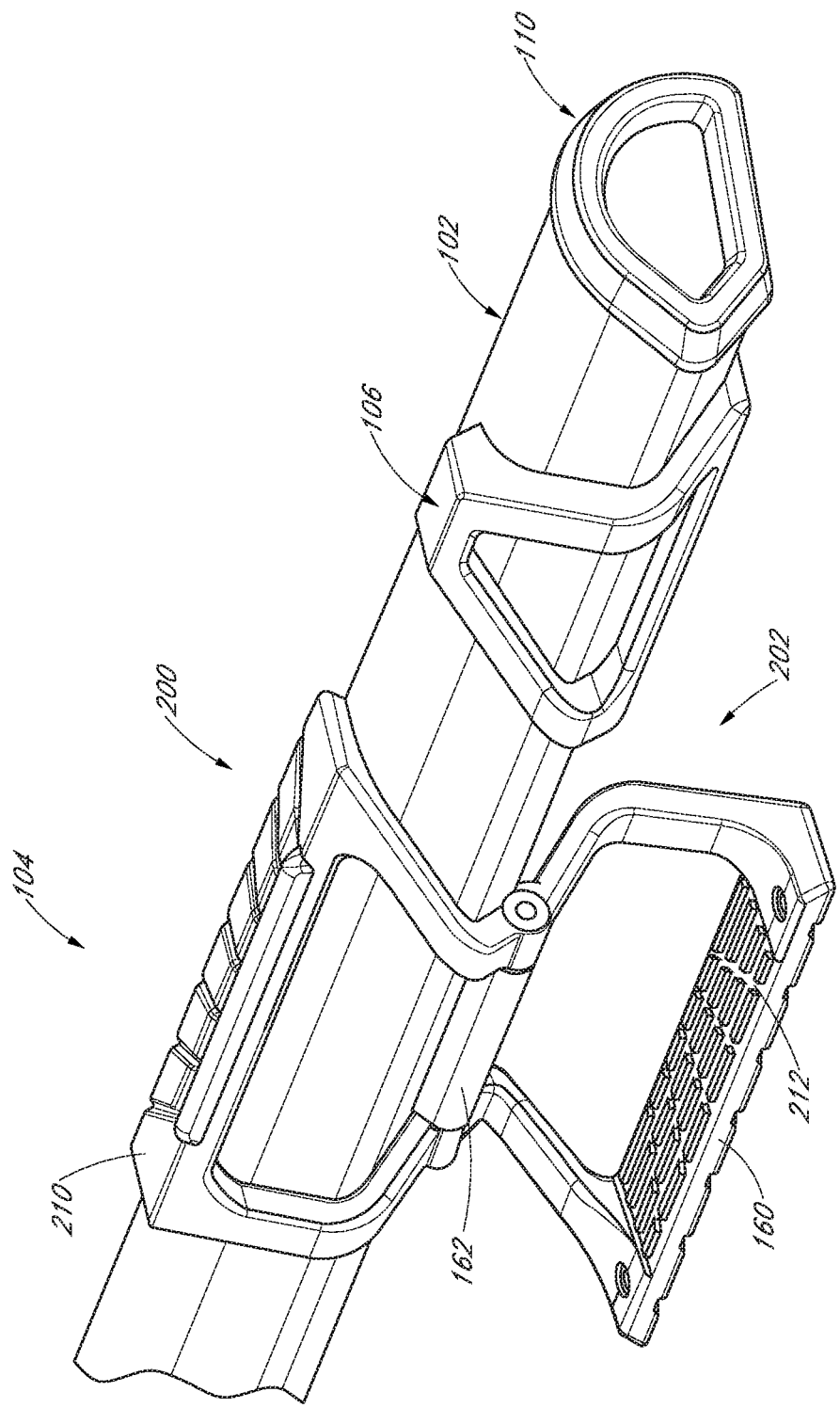

FIG. 7 is a close-up view of the right side of the support device 100 of FIG. 6.

Figure 8:
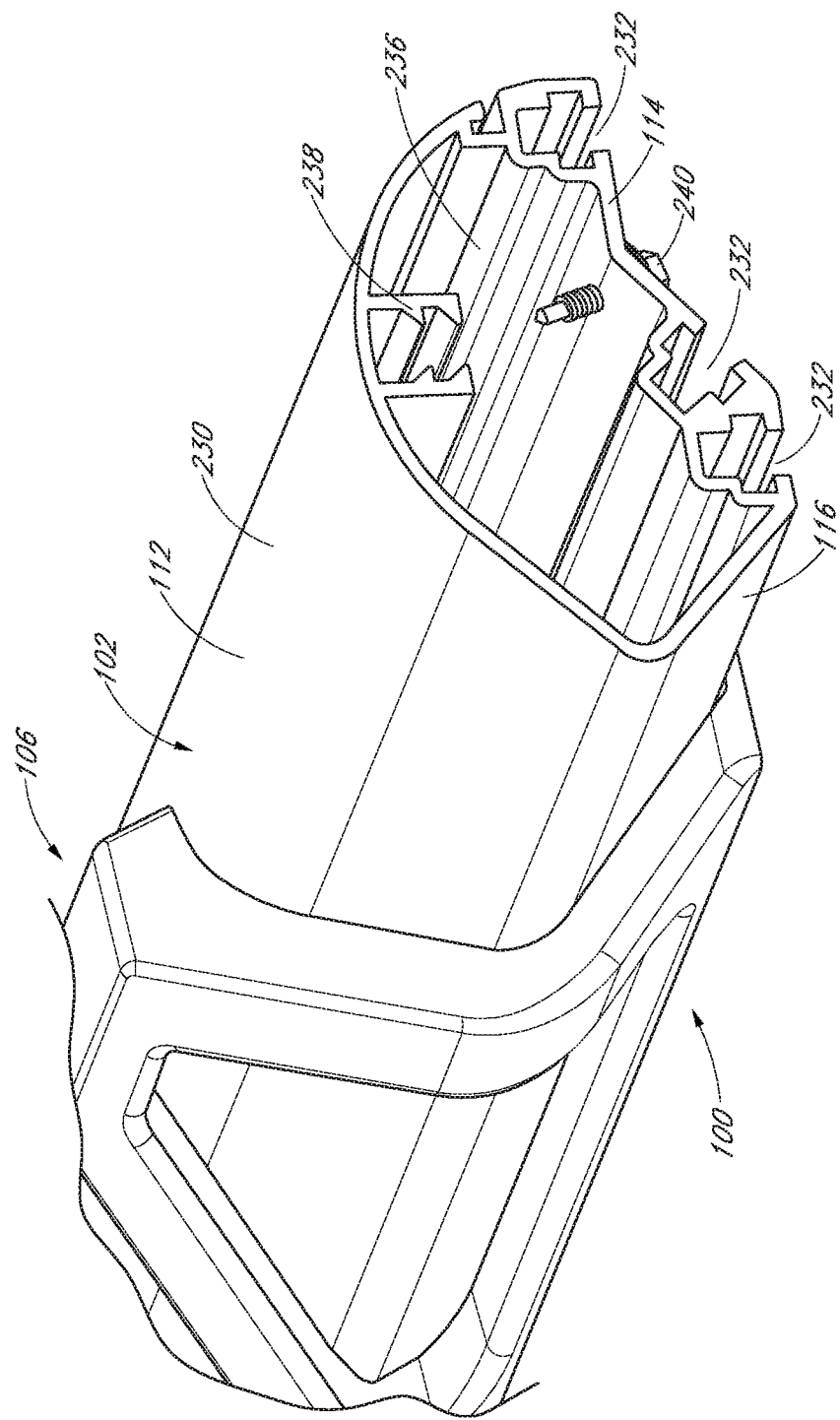

FIG. 8 is a right end view of the support device 100 of FIG. 7 shown without an end cover or cap 110 to expose the interior features of the support member 102. As shown, the support member 102 has a body 230 that is extruded with a curved upper surface or first surface 112, a lower surface or second surface 114, and a slanted side surface or third surface 116. The lower surface 114 is extruded with two or more bolt galleys or T-slots 232 for receiving bolt heads of fastener or nuts. The bolt galleys 232 can extend the length of the body 230 to enable the bolt heads or nuts to slide along the length thereof to enable adjustment of where along the body to secure the one or more decorative covers 106 and the one or more steps 104 along the length of the support member 102. Once the locations of the decorative covers 106, if included or utilized, and the steps 104 are chosen, fasteners can be tighten to secure the decorative covers and the steps at the final positions on the support member 102. If necessary, the fasteners can be loosen and the decorative covers 106 and the steps 104 can be re-aligned or adjusted or removed from the support member 102.

Inside the interior cavity 236 of the body 230, an internal bolt galley 238 is provided. Additional internal bolt galleys 238 may be incorporated or the internal bolt galley may be omitted altogether. Any number of components may be attached to the support member 102 and then fastened thereto via a fastener fastened to the internal bolt galley 238.

Also shown in FIG. 8 is a self-tapping bolt or screw 240 threaded to the lower surface 114 of the support member 102. This bolt 240, for example, can be used to fasten the extended piece of the cap 110 to the body 230 of the support member 102. Any number of other decorative pieces or components may be attached to the support member 102 via the one or more bolt galleys 232, 238 or by tapping directly into the walls of the support member. For example, the mounting brackets 108 (FIG. 2) may be secured to one or two of the bolt galleys 232 to then secure the support member 102 and components attached thereto to a vehicle. Optionally, the end cap 110 and/or the decorative cover 106 can be secured to the body of the support member 102 using bonding, tape, glue, detents, or combinations thereof.

FIG. 9 is an end view of a support device 100 shown without an end cap and provided to show the projection 168 (See also FIG. 4) on the body 166 of the second step part 162 connected to one of the bolt galleys 232 of the body 230 of the support member. Once the T-shaped projection 168 of the second step part 162 slides into the T-slot or bolt galley 232 on the support member 102, the second step part 162 can slide along the length of the bolt galley 232 to a final position and then secured to the support member using one or more fasteners. Thus, the step 104, including the first step part 160 and the second step part 162, is movable, such as being slidable, along the length of the support member. Once the second step part 162 is fastened to the support member 102, the step 104, such as the first step part 160, is movable, such as being rotatable, relative to the lengthwise axis of the tubular member.

Figure 10A:
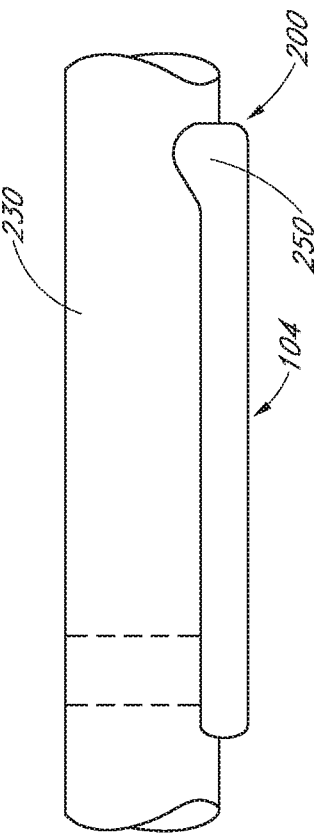
FIGS. 10A-10C are different views of a support device or assembly having an alternative step.
Figure 10B:
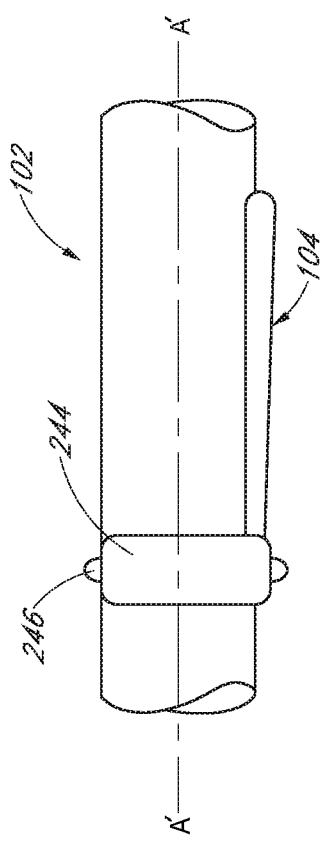
Figure 10C:
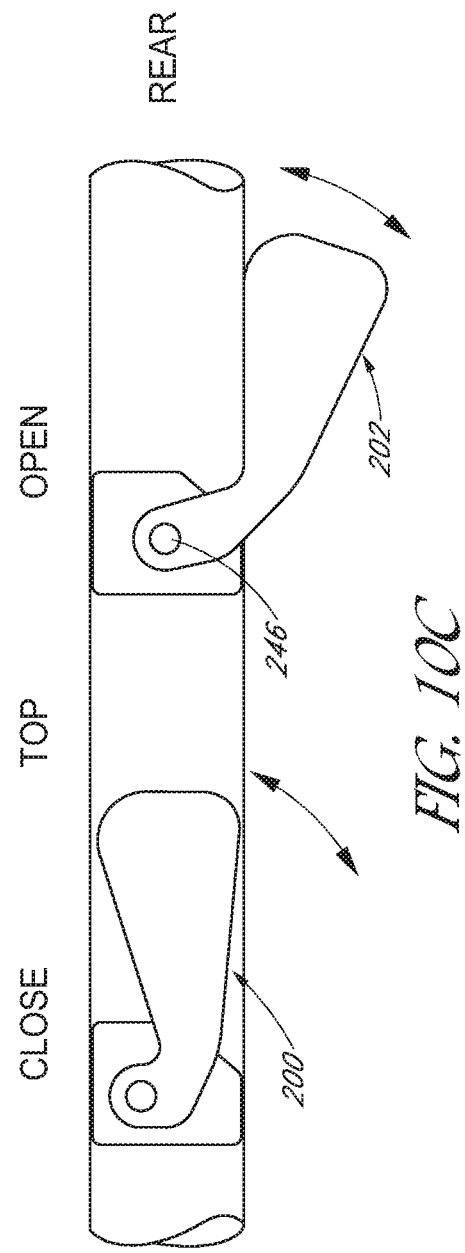

FIGS. 10A-10C depict different views of an alternative step 104 pivotably or rotatably connected to a support member 102. Whereas the steps in the embodiment of FIGS. 1 and 6-9 are rotatable clockwise or counter-clockwise around the lengthwise axis of the support member 102, in the present embodiment, the step 104 is rotatable about an axis that is orthogonal to the lengthwise axis of the support member. One or more decorative covers, such as covers 106 of FIG. 1 or FIG. 6, may be used with the support member of the present embodiment.

With particular reference to FIG. 10A, the support member 102 has a lengthwise axis A'-A'. A connecting joint 244 having a pivot pin 246 is provided through the support member 102. The pivot pin 246 has a pivot axis that is generally orthogonal to the lengthwise axis A'-A' of the elongated member. The connecting joint 244 can embody any number of shapes and configurations and are sufficiently strong to function as a weight bearing piece. The step 104 of the present embodiment can move, such as rotate, relative to the support member 102 along an axis that is generally orthogonal to the axis A'-A' of the support member.

FIG. 10B depicts a front view of a support assembly or device 100, which shows the step 104 rotated against the body 230 of the support member 102 such that a step piece 250, or a part of the step, is pushed against the body to fix the step to the body in a first folded position 250. Securement mechanism, such as detents, magnet, latches, etc. can be used to retain the step in a folded position 200 without rattling.

FIG. 10C shows two steps 104 mounted to the support member 102. One step 104 is shown in a first folded position 200 and a second step 104 is shown rotated to a second extended position 202. In the second extended position 202, the step 104 is rotated about the pivot pin 246.

The steps 104 described herein can be manually moved between the first folded position to the second extended position. However, it is contemplated that motors may be incorporated to automatically move the steps 104 between the first folded position to the second extended position. The motors can be wired to a controller for wireless operation to activate the steps or to the vehicle electrical system and programmed to cooperate with the opening and closing of the doors of the automobile. The motors for operating the steps can optionally be charged using power that is charged by solar panels mounted on the roof of the vehicle or elsewhere on the vehicle.

FIGS. 11-20 illustrate embodiments of the assembly where the second step part 162 of the step 104 is composed of or comprises multiple parts. The embodiments can be understood as embodiments of the step 104 for usage when mounted to a vehicle, such as to a pickup truck, a van or a sport utility vehicle (SUV), to name a few non-limiting examples. The number of steps 104 incorporated with the support device or running board 100 can depend on the number of doors the assembly is mounted to, such as a two door truck or a four door SUV. In some examples, a single step that is sufficiently wide is used with the support member 102 for a four-door vehicle is used. For example, a running board 100 with a single elongated step 104 to support the left side of a four-door vehicle may be used and another running board 100 with a single elongated step 104 to support the right side of the four-door vehicle may be used. The embodiments illustrate examples of a second step part 162 providing for rotational and positional retaining of the first step part 160.

Figure 11:
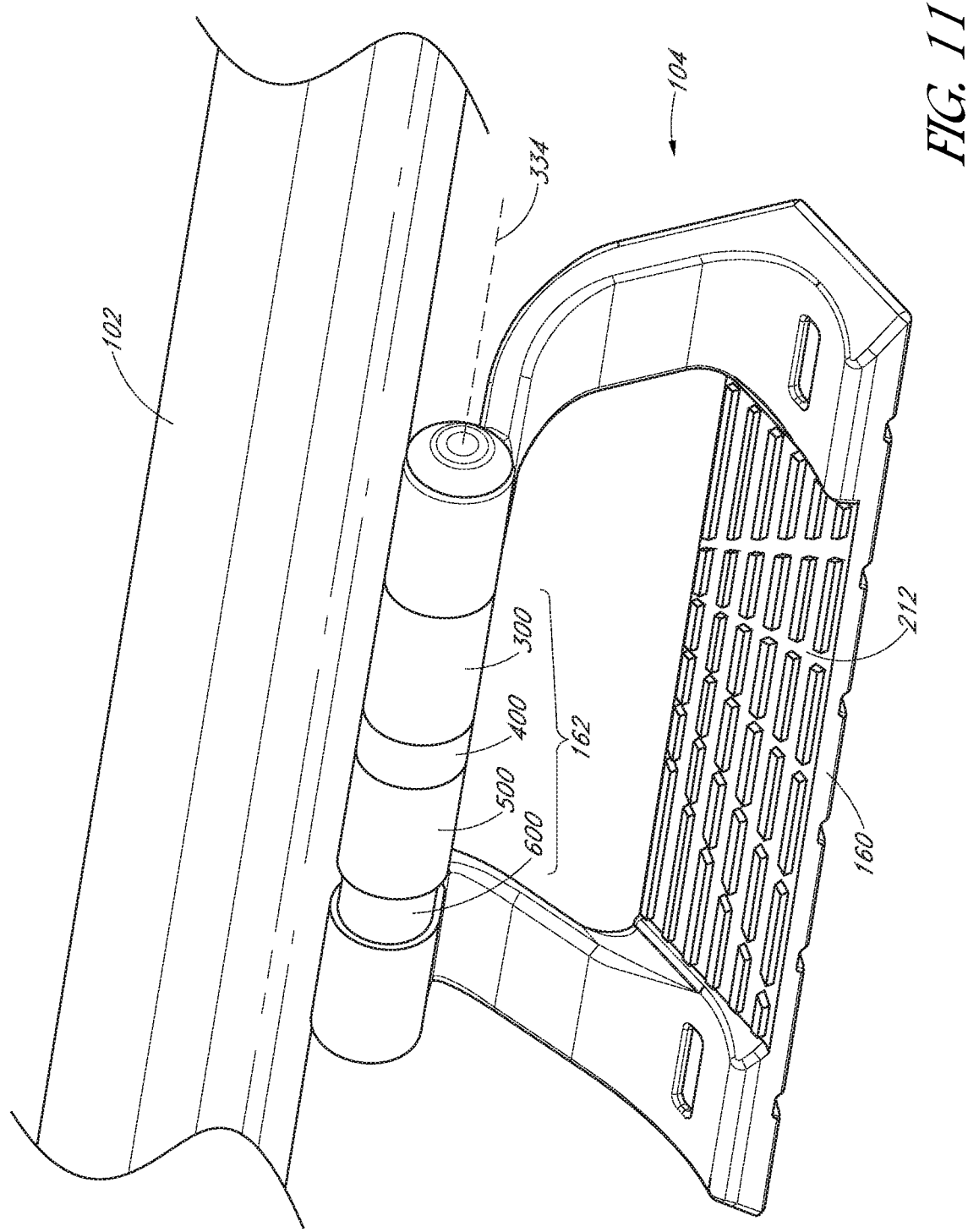
FIG. 11 shows an embodiment where the second step part can include a right step hinge, a hinge spacer, and a left step hinge.

FIG. 11 illustrates an embodiment where the second step part 162 can include a right or first step hinge 300, a hinge spacer 400, and a left or second step hinge 500. The second step part 162 can also include a spacer ring 600. Exemplary embodiments of the right step hinge 300, the hinge spacer 400, the left step hinge 500, and the spacer ring 600 can be found in FIGS. 12-15C.

For purposes of explanation, the embodiments will be explained as if the step 104 shown in FIGS. 11-20 are arranged on a left side of the vehicle or driver side. In this configuration, the left step hinge 500 is closer to a front side, engine section, or forward side, of a vehicle and the right step hinge 300 is closer to a rear side of the vehicle. In implementation on multiple sides of the vehicle, it is understood that the forward and rear orientation of the components of the step 104 relative to the vehicle can be different. For example, the step 104 arranged on a right side of the vehicle would have an opposed orientation with the right step hinge 300 closer to the forward side of the vehicle and the left step hinge 500 closer to the rear side of the vehicle. The first step hinge 300 can be considered as the component that is closer to rear side and the second step hinge 500 can be considered the component that is closer to the front side, which are applicable for a left-side mount support device 100 and a right-side mount support device 100.

The first step hinge 300 and the second step hinge 500, which can be called the right step hinge 300 and the left step hinge 500 based on the support apparatus being mounted on the left side of a vehicle, can be coupled to the support member 102 through galleys or T-slots 232, such as those disclosed in FIGS. 6 and 8.

The first step part 160 can be attached to the second step part 162 such that the first step part 160 can be rotatable around an axis 334 extending through the right step hinge 300, the hinge spacer 400, and the left step hinge 500. The rotation axis 334 can be aligned to be generally parallel to the lengthwise direction of the vehicle.

The right step hinge 300 can include at least one detent recess 302. The detent recess 302 can correspond with a detent protrusion 160p of the first step part 160. Exemplary embodiments of the detent recess 302 can be seen in FIGS. 13A-13D. Exemplary embodiments of the detent protrusion 160p can be seen in FIG. 16D. The detent recess 302 and the detent protrusion 160p can have corresponding shapes to mesh. For example, they can have matching arcuate sections for fitment. Alternative shapes for the detent recess and detent protrusion can be contemplated, including sawteeth designs, such as meshing gear teeth, to allow for multiple deployment positions of the first step part. Additionally, the application of recesses and protrusions can be switched between the right step hinge 300 and the first step part 160.

Figure 18:
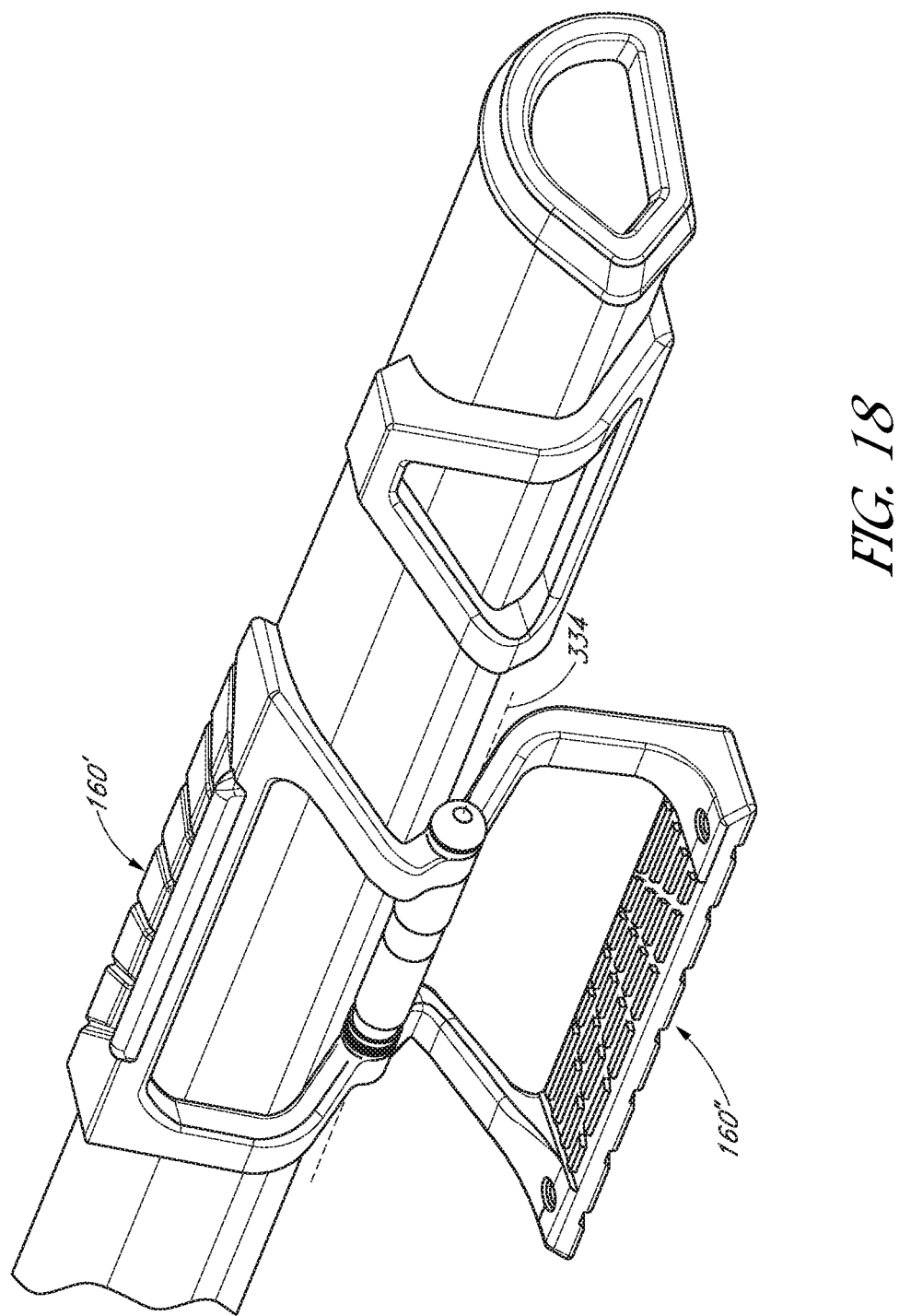
FIG. 18 illustrates two positions of the first step part 160.

In general, the operation of the step 104 allows for rotation of the first step part 160 relative to the second step part 162 about the axis of rotation 334 such that the first step part 160 can move between a first, folded position 160' and a second, deployed position 160" as shown in FIG. 18, which may also be referred to as first folded position 200 and a second extended position 202 as shown in FIG. 6. Additional detail regarding the deployment and folding operations are detailed below. Generally, the first step part 160 can be moved along the axis of rotation, relative to the fixed position of the second step part 162, such that the detent protrusion 160p of the first step part 160 separates from the detent recess 302 of the right step hinge 300 to allow for rotation of the first step part 160 relative to the right step hinge 300.

The separation can be achieved by usage of rearward force, such as that of a user's foot or hand, on the first step part 160 in order to move the first step part 160 rearward along the axis of rotation 334 in order to separate the first step part 160 from the right step hinge 300. As detailed in FIG. 17, a biasing spring 700 can be used to bias the first step part 160 forward along the axis of rotation 334 when the rearward force is removed. Accordingly, operation of the step 104 can be envisioned as moving the first step part 160 rearward along the axis of rotation and then rotating the first step part 160 to a desired position.

Figure 12:
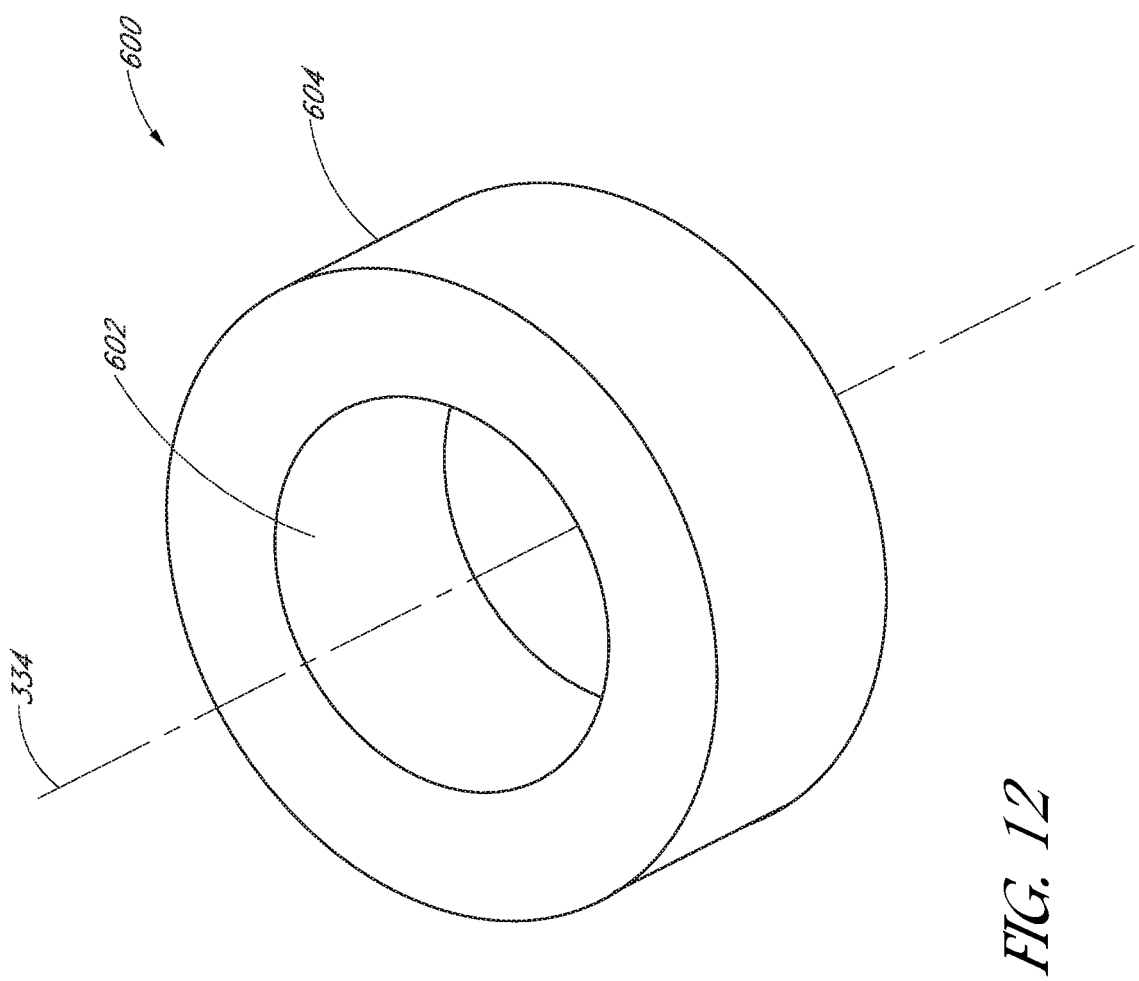
FIG. 12 show an exemplary embodiment of a spacer ring.

FIG. 12 illustrates an exemplary embodiment of the spacer ring 600. The spacer ring 600 can be generally ring shaped with an outer diameter 604 and an inner diameter 602. The outer diameter 604 can be sized and shaped to fit with a left step hinge 500. The inner diameter 602 can be sized to receive a portion of the first step part 160 to engage the first step part 160. The spacer ring 600 can act as a movement stop limit for movement of the first step part 160 along the axis of rotation 334 as detailed below.

FIGS. 13A-D illustrate an exemplary embodiment of a right step hinge 300 for the second step part 162. FIG. 13A shows a perspective view from a forward side of the right step hinge 300. The right step hinge 300 can have a main body 310. The main body 310 can have a cross sectional shape, transverse to the vehicle, that is generally v-shaped or resembling a v-shaped structure. The generally v-shaped structure being defined by a first lower surface 312a, a first upper surface 312b, and a second lower surface 314. The cross sectional shape can alternatively be differently shaped.

As shown in FIGS. 13A and 13B, the body 310 of the right step hinge 300 can have a rear side surface 318 and a forward side surface 319 on opposed ends of the main body 310. On a side of the body 310 opposite of where the first lower surface 312a and the second lower surface 314 contact, there can be provided a mounting surface 316 for contact with the support member 102. Protruding from the mounting surface 316 can be T-slot rails 304a, 304b. The T-slot rails 304a, 304b can engage with the T-slot groove of the support member 102 for mounting of the right step hinge 300 to the support member 102 of the running board.

Between the T-slot rails 304a, 304b can be a through hole 306 extending through the main body 310. The through hole 306 can be for a retention component, such as a set screw or fastener, to fix the location of the right step hinge 300 relative to the support member 102. FIGS. 13B and 13D show an access cutout 308 on the opposite end of the through hole 306 from the mounting surface 316. The access cut out 308 can have a larger diameter than the diameter of the through hole, such that there is ready access for tools to reach the retention component during installation or servicing.

FIG. 13B illustrates that above the second lower surface 314, there can be a cylindrical portion 320 projected from a side of the main body 310. The cylindrical portion can have a bore 324 for engagement with the first step part 160 for rotation, therefore having an axis coinciding with the axis of rotation 334 when in an assembled state. The cylindrical portion 320 can extend from the forward side surface at least partially along the side of the main body 310, with the cylindrical portion 320 having a rear cylindrical surface 322. Above the second lower surface 314, an alignment surface 330 can extend the remainder of the length of the side of the main body 310 beyond the cylindrical portion 320. The alignment surface 330 can be curved or radiused to similarly follow the radius of the cylindrical portion 320 from the axis of rotation 334. The alignment surface 330 can have a slightly larger radius from the axis of rotation 334 than the radius of the cylindrical portion 320, such that the alignment surface is set back. The alignment surface 330 can aid in general placement of the first step part 160 during installation.

Also, on the rear cylindrical surface 322, there can be provided the detent recess 302. FIGS. 13B and 13C illustrate an exemplary embodiment where there are two detent recesses 302. The detent recesses can be located opposite one another around a circumference of the rear cylindrical surface 322. This can allow for 180 degrees of rotation of the first step part 160 by engagement of a detent protrusion 160p between the two opposed detent recesses 302.

Additionally, FIGS. 13C and 13D also illustrate that the rear side surface 318 can also have a lower chamfer portion 307. The lower chamfer portion 307 can be provided for aesthetic or functional reasons, such as limiting overhang of the assembly 100 underneath the vehicle. Similarly, as part of the cross sectional shape, the first upper surface 312b can have an angle relative to the mounting surface 316 different from the first lower surface 312a relative to the mounting surface 316. The angle difference between the first upper surface 312b and the first lower surface 312a can allow for a slimmer right step hinge 300 for a given height of the main body 310. By having the first upper surface 312b generally perpendicular to the mounting surface 316, the tapering down of the main body from the convergence of the first lower surface 312a and the second lower surface 314 can be less acute for a given height.

FIGS. 14A-D illustrate an exemplary embodiment of a left step hinge 500 for the second step part 162. FIG. 14A shows a perspective view from a forward side of the left step hinge 500. The left step hinge 500 can have a main body 510. The main body 510 can have a cross sectional shape, transverse to the vehicle, that is generally v-shaped or resembling a v-shaped structure, the v-shape being defined by a first lower surface 512a, a first upper surface 512b, and a second lower surface 514. The cross sectional shape can alternatively be differently shaped.

As shown in FIGS. 14A and 14B, the left step hinge 500 can have a rear side surface 518 and a forward side surface 519 on opposed ends of the body 510. On a side of the main body 510 opposite of where the first lower surface 512a and the second lower surface 514 contact, there can be provided a mounting surface 516 for contact with the support member 102. Protruding from the mounting surface 516 can be T-slot rails 504a, 504b. The T-slot rails 504a, 504b can engage with the T-slot or rail of the support member 102 for mounting of the left step hinge 500 to the support member 102.

Between the T-slot rails 504a, 504b can be a through hole 506 extending through the body 510. The through hole 506 can be for a retention component, such as a set screw or fastener, to fix the location of the left step hinge 500 relative to the support member 102. FIGS. 14B and 14D show an access cutout 508 on the opposite end of the through hole 506 from the mounting surface 516. The access cut out 508 can have a larger diameter than the diameter of the through hole, such that there is easier access for tools to reach the retention component during installation or servicing.

FIG. 14C illustrates that above the second lower surface 514, there can be a cylindrical portion 520 projected from a side of the main body 510. The cylindrical portion can have a bore 524 for engagement with the first step part 160 for rotation, therefore having an axis coinciding with the axis of rotation 334 when in an assembled state. The cylindrical portion 520 can extend from the rear side surface at least partially along the side of the main body 510, with the cylindrical portion 520 having a forward cylindrical surface 322. Above the second lower surface 514, an alignment surface 530 can extend the remainder of the length of the side of the main body 510 beyond the cylindrical portion 520. The alignment surface 530 can be curved or radiused to similarly follow the radius of the cylindrical portion 520 from the axis of rotation 334. The alignment surface 530 can have a slightly larger radius from the axis of rotation 334 than the radius of the cylindrical portion 520, such that the alignment surface is set back. The alignment surface 530 can aid in general placement of the first step part 160 during installation.

Additionally, FIG. 14A illustrates that the forward side surface 519 can also have a lower chamfer portion 507. The lower chamfer portion 507 can be provided for aesthetic or functional reasons, such as limiting overhang of the assembly 100 underneath the vehicle. Similarly, as part of the cross sectional shape, the first upper surface 512b can have an angle relative to the mounting surface 516 different from the first lower surface 512a relative to the mounting surface 516. The angle difference between the first upper surface 512b and the first lower surface 512a can allow for a slimmer left step hinge 500 for a given height of the main body 510. By having the first upper surface 512b generally perpendicular to the mounting surface 516, the tapering down of the main body from the convergence of the first lower surface 512a and the second lower surface 514 can be less acute for a given height.

FIGS. 15A-C illustrate an exemplary embodiment of a center hinge spacer 400 for the second step part 162. FIG. 15A illustrates a side view of the center hinge spacer 400 from a forward side surface 419. The center hinge spacer 400 can generally have the same cross sectional shape as the cross sectional shape of the rear side surface 518 of the left step hinge 500 or the forward side surface 319 of the right step hinge of the right step hinge 300.

The center hinge spacer 400 can have a main body 410. The main body 410 can have a cross sectional shape, transverse to the vehicle, that is generally v-shaped, the v-shape being defined by a first lower surface 412a, a first upper surface 412b, and a second lower surface 414. The cross sectional shape can alternatively be differently shaped.

On a side of the main body 410 opposite of where the first lower surface 412a and the second lower surface 414 contact, there can be provided a mounting surface 416 for contact with the support member 102. Protruding from the mounting surface 416 can be a T-slot rail 404. The T-slot rail 404 can engage with the T-slot or rail of the support member 102 for mounting of the center hinge spacer 400 to the support member 102.

Figure 17:
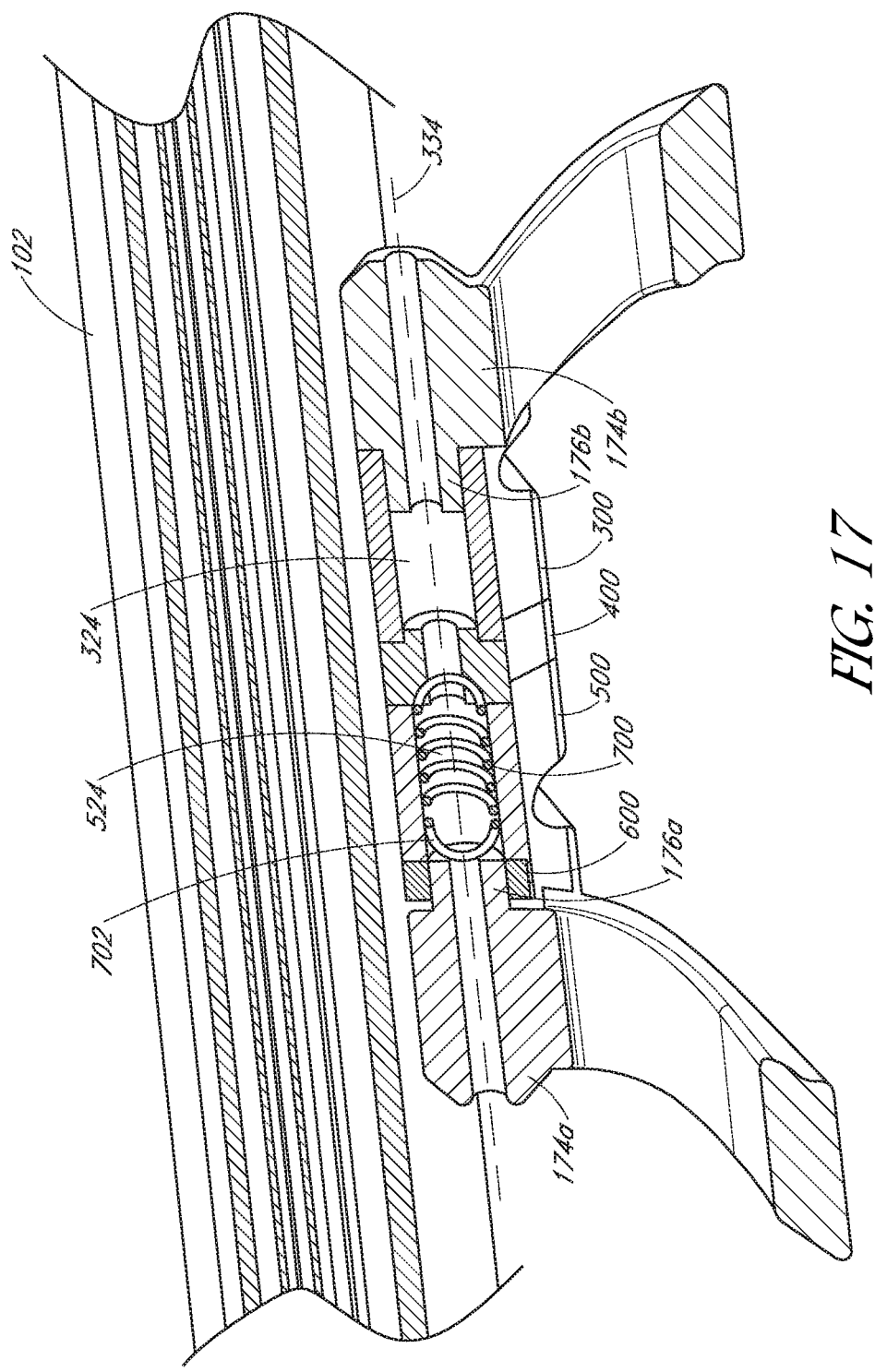
FIG. 17 shows a cross sectional view of an exemplary embodiment of the step in the second, deployed position

Above the second lower surface 414, there can be a cylindrical portion 420 projected from a side of the main body 410. On the forward side 419, the cylindrical portion 420 can have a bore 450. The bore 450 can have an axis coinciding with the axis of rotation 334 when in an assembled state. The bore 450 can be smaller in diameter than the bore 324 of the right step hinge 300 or the bore 524 of the left step hinge 500. As shown in FIG. 17, in an assembled state, the smaller diameter bore 324 can allow for seating of a spring against the forward side surface 419.

Additionally, there can be a slot 430 extending across the bore 450 and extending partially into the center hinge spacer 400. The slot 430 can be used for retaining an end of a spring as shown in FIG. 17.

FIGS. 15B and 15C illustrate a bore projection 452 projecting from the rear side surface 418. The bore projection 452 can be a ring shaped projection having an outer diameter that is larger than the bore 450, and that has the bore 450 defining its inner diameter. The bore projection 452 can be sized and shaped to correspond and fit into the bore 324 of the right step hinge 300.

The simplistic design of the center hinge spacer 400 can allow for changing of length. In this way, first step parts 160 of different lengths can be accounted for by changing the length of the center hinge spacer 400 without needing redesign of the left step hinge 500 or the right step hinge 300.

Figure 16A:
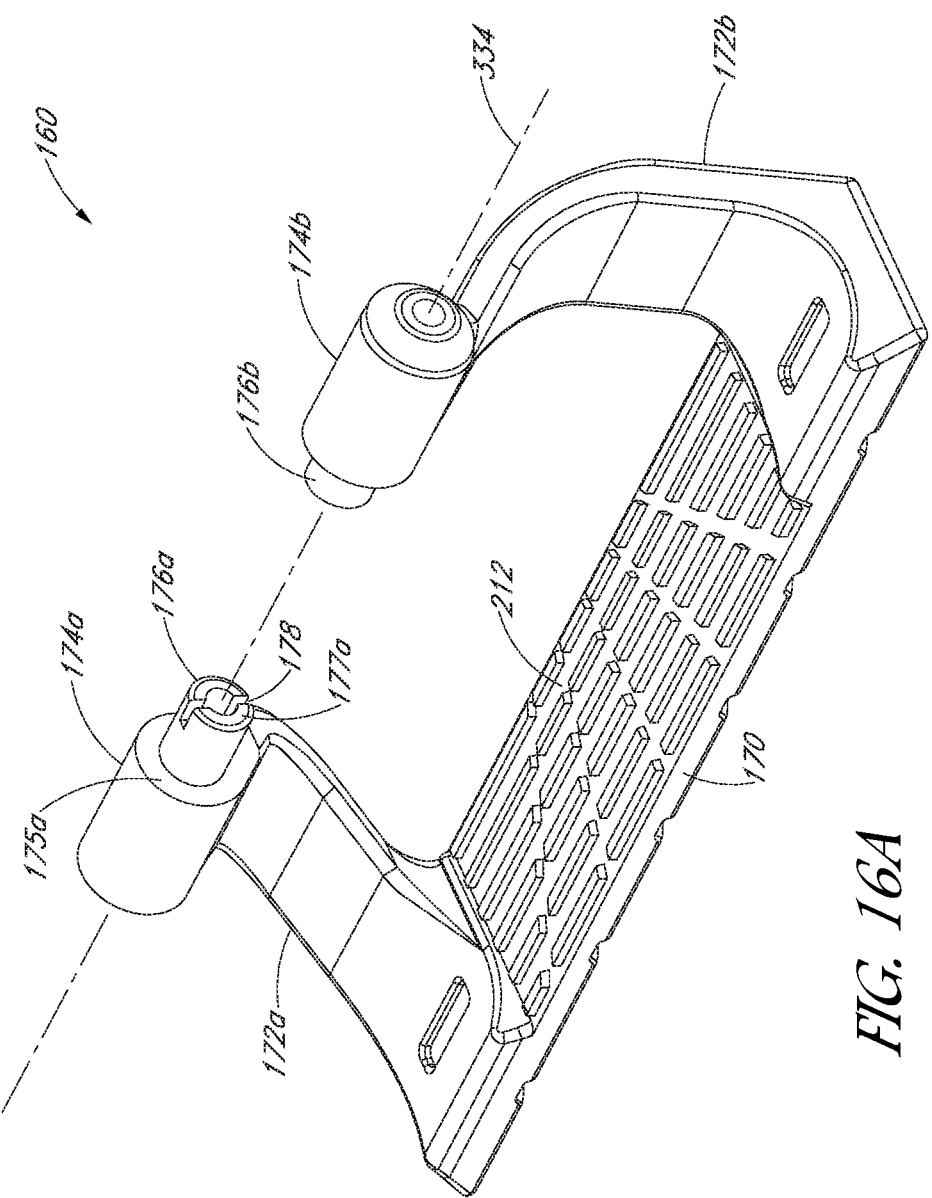

FIGS. 16A-16D illustrate an exemplary embodiment of a first step part 160. The first step part 160 can be composed of multiple leg portions. FIG. 16A illustrates the embodiment where the first step part 160 includes a first leg 170, a first side leg 172a, and a second side leg 172b, as further shown in FIGS. 16B-16D.

The first step part 160 can be generally conceived of as a u-shaped component. The first leg 170 can be a center portion of the first step part 160, with first ends of each of the first side leg 172a and the second side leg 172b joined to the opposed ends of the first leg 170. Second ends of the first side leg 172a and the second side leg 172b can be joined to two mounting portions 174a, 174b. The mounting portions 174a, 174b each can have mounting lugs 176a, 176b, the mounting lugs 176a, 176b being sized and shaped to rotatably couple with the bore 324 of the right step hinge 300 or the bore 524 of the left step hinge 500. An axis of the mounting portions 174a, 174b and mounting lugs 176a, 176b can coincide with the axis of rotation 334 in an assembled state.

The first leg 170 can have a first surface 210 and a second surface 212. One or both surfaces 210, 212 of the first leg 170 can have geometric features, which can serve as traction features, such as bumps or projections, to increase traction between the first step part 160 and an individual's feet or shoes. Alternatively, the geometric features can be merely for aesthetic considerations and do not need to necessarily increase traction.

FIGS. 16B-16D illustrates the exemplary embodiment where the two side legs 172a, 172a of the first step part 160 are tapered inwardly and both having a curved body. The geometry of the two side legs 172a, 172b can be shaped to correspond to the geometric shape of the support member 102, such that the two side legs 172a, 172b closely follow the geometric shape of the support member 102 in a first, folded position of the first step part 160.

Alternatively, the side legs 172a, 172b can be sized and shaped differently for aesthetic affect without interfering with the rotation of the first step part 160 relative to the support member 102.

FIGS. 16C and 16D illustrate embodiments of the mounting lugs 176a, 176b, which can be sized and shaped to be insertable into and rotatably coupled with the bore 324 of the right step hinge 300 and the bore 524 of the left step hinge 500. The mounting lugs 176a, 176b can extend from mounting portion surfaces 175a, 175b. In the exemplary embodiment, a first mounting lug 176a of the mounting lugs corresponds with the bore 524 of the left step hinge 500. The second mounting lug 176b of the mounting lugs corresponds with the bore 324 of the right step hinge 300. The mounting lugs 176a, 176b can have an internal bore, or they can be solid. The first mounting lug 176a can have a slot 178 extending across a distal surface 177a and extending partially into the first mounting lug 176a. The slot 430 can be used for retaining an end of a spring as shown in FIG. 17. The second mounting lug 176b can have a distal surface 177b that can either have an internal bore or be solid.

One of the mounting portion surface 175b can have at least one detent protrusion 160p. In the exemplary embodiment illustrated in FIG. 16D, the mounting portion surface 175b has two detent protrusions 160p offset on opposite one another around a circumference of the mounting portion surface 175b. As further detailed in FIG. 17, this can allow for 180 degrees of rotation of the first step part 160 by engagement of the two detent protrusions 160p between two opposed detent recesses 302.

The components from FIGS. 12-16D can be made from a suitable material, such as a rigid and durable plastic material, a composite, or a metal material. Preferably, the first step part 160, the spacer ring 600, the right step hinge 300, the center hinge spacer 400, and the left step hinge 500 are made from an aluminum material. Manufacturing processes can include such options as machining aluminum material, casting aluminum with other metallic materials, and injection molding with powdered metallurgy as contemplated. In an example, the step 104 is configured to be weight bearing and capable of supporting individuals stepping on and off of the step 104 to enter and exit the vehicle.

FIG. 17 illustrates a cross sectional view of an exemplary embodiment of the step 104 the second, deployed position 160" as shown in FIG. 18. In an assembled state, the right step hinge 300, the center hinge spacer 400, and the left step hinge 500 can be considered a fixed grouping of components relative to the support member 102 through the T-slots. When assembled, the bore projection 452 can be received in the bore 324 of the right step hinge 300, such that the center hinge spacer 400 abuts the right step hinge 300. Also, the left step hinge 500 can abut the opposite side of the center hinge spacer 400. The positioning of the right step hinge 300, the center hinge spacer 400, and the left step hinge 500 relative to the support member 102 can be fixed by way of the through holes 306, 506 as shown in FIGS. 13A and 14A.

Additionally, a biasing spring 700 can be in the bore 524 of the left step hinge 500, biasing the first mounting lug 176a against the center hinge spacer 400. The spring 700 can also have flat ends 702, 704 that are retained in the slots 178, 430 of the first mounting lug 176a and the center hinge spacer 400. Alternatively, the spring can be free in the bore without fixation in the slots. The first mounting lug 176a can be fitted partially into the bore 524 of the left step hinge 500 and the second mounting lug 176b can be fitted partially into the bore 324 of the right step hinge 300. In this way, the mounting portions 174a, 174b are rotatably coupled with the left step hinge 500 and the right step hinge 300 along the axis of rotation 334. The spacer ring 600 can be placed between the first mounting portion 174a and the cylindrical portion of the left step hinge 500.

Visualized, the spring 700 biases the first mounting lug 176a forward, or away from the left step hinge 500 such that the second mounting lug 176b abuts the right step hinge 300. As shown in the embodiments of FIGS. 13A-13D and 16A-16D, the detent protrusions 160p and the detent recesses 302 can thus be in an engaged position.

Operationally, when a user acts on the first step part 160 to bias it rearward, the spring 700 is compressed and the detent protrusions 160p and the detent recesses 302 will disengage. This will allow for rotation for the first step part 160 relative to the support member 102 about the axis of rotation 334. In the exemplary embodiment, when the first step part 160 is rotated 180 degrees, the detent protrusions 160p and the detent recesses 302 will align. When the user releases the biasing force on the first step part 160, the biasing spring 700 can be bias the first step part 160 forward such that the detent protrusions 160p and the detent recesses 302 engage with one another.

In some embodiments, the spring 700 is there for compressive force along the axis of rotation 334. In some embodiments, the spring 700 may be sized and shaped to provide rotational biasing. As the ends of the spring 700 can be fixed to the slots 178, 430 of the first mounting lug 176a and the center hinge spacer 400, there can be rotational biasing.

In this way, when the first step part 160 is rotated 180 degrees, the spring can provide a restorative, biasing force, to aid in returning the first step part 160. For example, if the natural state of the spring 700 is in the first, folded position, it can provide a restorative force from the second, deployed position to aid in returning the first step part 160 to the first, folded position.

Additionally, in alternative embodiments, the arrangement of the elements can be reversed such that the left step hinge 500 has the detent recess 302 and the first mounting portion 174a of the first step part 160 can have the detent protrusion 160p.

Alternatively, different designs can be used for the detent protrusions 160p.

FIG. 18 illustrates two positions of the first step part 160. FIG. 18 does not illustrate two separate first step parts installed together, but rather is merely illustrative of the positions that the singular first step part 160 can achieve. In general, the operation of the step 104 allows for rotation of the first step part 160 about the axis of rotation 334 such that the first step part 160 can move between a first, folded position 160' and a second, deployed position 160".

Figure 19:
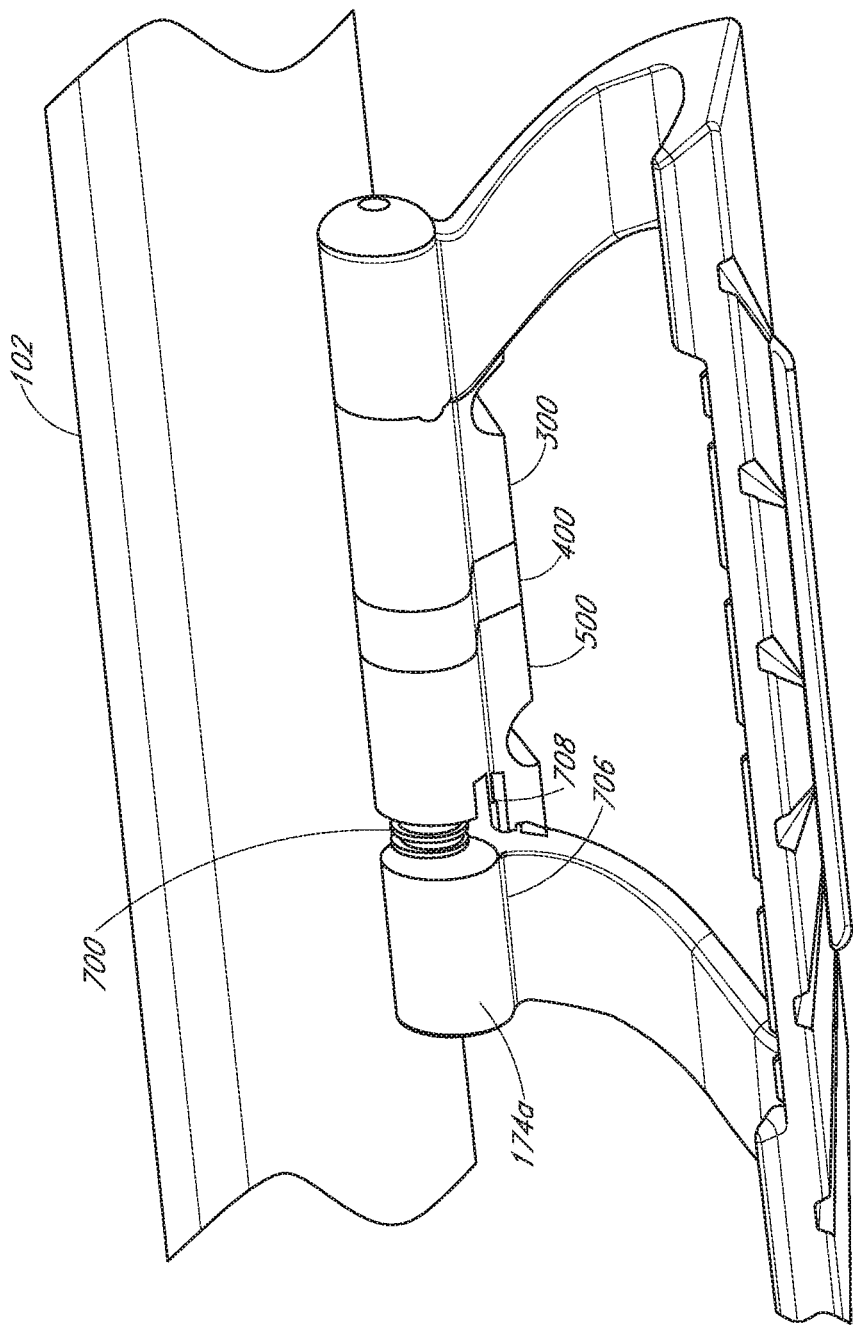
FIGS. 19 and 20 show different views of an embodiment with an exposed spring without a spacer ring.
Figure 20:
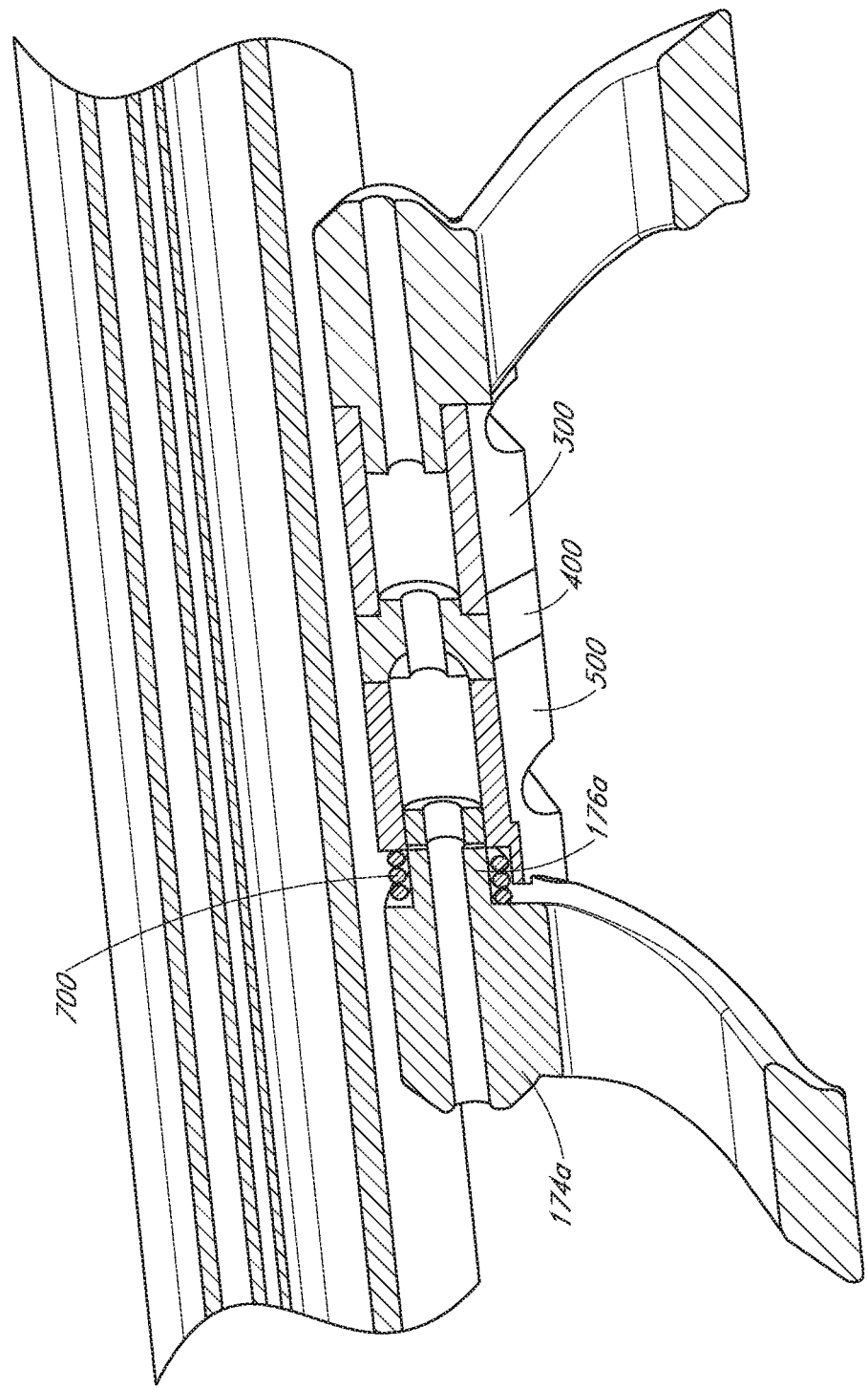

FIGS. 19 and 20 illustrate an embodiment with an exposed spring without the spacer ring 600. FIG. 19 illustrates a perspective view of an embodiment with an exposed spring. FIG. 20 illustrates a cross sectional view of the embodiment. The right step hinge 300, the center hinge spacer 400, the left step hinge 500, and the first step part 160 can be arranged similarly to the embodiments shown in FIGS. 11, 17, and 18. However, the spring 700 can be placed around the outside of the mounting lug 176*a* between the mounting portion 174*a* and the cylindrical portion of the left step hinge 500. Optionally, the spring 700 can have two end ears 706, 708 for fixation. In some embodiments, the mounting portion 174*a* and the cylindrical portion of the left step hinge 500 can have slots provided to receive the end ears 706, 708 to fix their position rotationally.

In some embodiments, the mounting lugs and the bores can be switched between the first step part 160 and the second step part 162.

Alternative features can also be provided to achieve the rotation of the first step part 160 relative to the second step part 162 and the support member 102. Some embodiments can provide for the ability to rotate and retain the position of the first step part 160 relative to the second step part 162 without the need for the detent recess, the detent protrusion, or axial movement of the first step part 160 by a user before rotational movement.

Instead of interfacing surfaces of the first step part 160 and the second step part 162 that are transverse, or perpendicular, to the axis of rotation 334 as shown in FIGS. 11-20, the interfacing surfaces can have camming features. For example, the interfacing surfaces can have corresponding sides of a large curve. Such a large curve may have the shape of a bell curve or a sinusoidal shaped curve. In this way, the interfacing surfaces are fully mated in the first, folded position 160' and the second, deployed position 160". A biasing spring can be coupled between the first step part 160 and the second step part 162 to bias the first step part 160 and the second step part 162 together. The combination of the biasing spring and the curvature of the interfacing surfaces can prevent the first step part 160 from undesired rotation, such as when the vehicle itself is moving.

With such a feature, when a rotational movement is applied to the first step part 160 by a user, the curvatures of the interfacing surfaces force the first step part 160 to move along the axis of rotation 334 relative to the second step part 162. This also loads the biasing spring and results in a restorative force by the biasing spring. Accordingly, the user only has to provide a rotational movement instead of a two part movement of the first movement of the first step part 160 along the axis of rotation before rotational movement. Instead, the curvature of the interfacing surfaces provides for both retention of the first step part 160 in a particular position and allows for rotation when subject to sufficient force to overcome the biasing spring to allow for sliding movement along the curved interfacing surfaces. The use of a bell curve or sinusoidal curve can allow for rotational movement in either direction of rotation.

In some embodiments, the curvature shape of the interfacing surfaces can be symmetrical between the range of rotation from the first, folded position 160' to the second, deployed position 160". This can allow for equal force to be applied for rotation in the two directions. Alternatively, the curvature shape of the interfacing surfaces can be asymmetrical such that one direction of rotation requires a higher force from the user than the opposite direction of rotation.

Alternative geometric shapes beyond smooth curves can be contemplated, such as trapezoidal or triangular shapes.

Additionally, the interfacing surfaces can have a plurality of geometric features as necessary for design considerations or for providing a plurality of stoppable positions of rotation of the first step part 160.

In some embodiments, the interfacing surfaces of the first step part 160 and the second step part 162 can have corresponding geometric shapes to allow for rotational movement in only one direction without requiring a user to provide an axial movement first. For example, a geometric shape such as a right triangle can provide for a camming feature in one direction of rotation. Upon reaching the edge of the camming surface, the first step part 160 and the second step part 162 can be prevented from rotating in the opposite direction. Instead, the user must move the first step part 160 in a direction along the axis of rotation 334 to sufficiently clear the edge of the right triangle geometric shape of the interfacing surface to rotate the first step part 160 in the opposite direction.

In embodiments, both the first step part 160 and the second step part 162 can have the corresponding geometric shapes. In other embodiments, only one of the first step part 160 and the second step part 162 can have the geometric shape, and the other part can merely have a shape sufficient to interface with the geometric shape to allow for rotation of the first step part.

Additionally, the interfacing surfaces can have a plurality of geometric features as necessary for design considerations or for providing a plurality of stoppable positions of rotation of the first step part 160.

In some embodiments, no biasing springs may be needed as no axial movement of the first step part relative to the second step part is necessary. Instead, the first step part 160 and the second step part 162 can each have one of a corresponding spring loaded ball bearing or a corresponding recess for the ball bearing. In this way, one of the first step part 160 and the second step part 162 has at least one recess corresponding to a position of the first step part 160. The spring loaded ball bearing can be provided in the other of the first step part 160 and the second step part 162 such that the ball bearing engages in the recess in the desired position of the first step part 160. Sufficient force to overcome the spring loaded ball bearing is then needed to move the first step part 160 relative to the second part 162. The recesses can be provided for both the first, folded position 160' to the second, deployed position 160", or only for the first, folded position.

In some embodiments, the first step part 160 can be coupled to a rotational biasing spring. As such, the rotational biasing spring may bias the first step part 160 to a position. There can be a locking mechanism to hold the first step part 160 when the user rotates the first step part 160 against the biasing force of the biasing spring. The locking mechanism can have a one-press release, so that the first step part 160 can be released and return to the biased position. For example, the first step part 160 can be biased by the rotational biasing spring to the first, folded position. The user can then readily rotate the first step part 160 to lock via the locking mechanism in the second, deployed position. The user can then simply release the locking mechanism, and the rotational biasing spring can return the first step part 160 to the first, folded position.

In some embodiments, a side biasing locking spring can be used to shift the first step part 160 transversely relative to the axis of rotation 334. The radial biasing locking spring can include at least one spring configured to apply a side biasing force against a mounting lug 176*a*, 176*b*. In one or more embodiments, the first step part 160 and the second step part 162 can have corresponding grooves and slots for desired positions, such as the first, folded position and the second, deployed position that are located. The first step part 160 can move radially to engage a groove or slot with a corresponding groove or slot of the second step part 162 in a desired position, to prevent rotation. The side biasing locking spring can provide a biasing force against the mounting lug to bias the first step part 160 for such radial movement and engagement. Application of a force by a user to separate the groove and slot can then allow for rotation.

In operation, an embodiment can provide that the side biasing locking spring biases a mounting lug upward to engage the groove and the slot of the first step part and the second step part in the first, folded position. From the first, folded position, the user can step down to oppose the side biasing locking spring such that the groove and slot are separated from one another to allow for rotation of the first step part. After rotation to the second, deployed position, when the user releases pressure from the first step part 160, the side biasing locking spring can move the mounting lug such that a groove and a slot of the first step part and the second step part engage one another.

In some embodiments, rotation of the first step part can be achieved by motorized drive. The motorized drive can be a direct drive motor built into one of the first step part 160 and the second step part 162. Alternatively, the motorized drive can include a gearbox or a linkage drive, such as a belt drive, chain drive, or shaft drive to provide the rotation ability. The motorized drive can be standalone, or it can be incorporated into one of the above described embodiments.

One or more of the above embodiments can be used for rotational movement or also in conjunction with a first step part that can move along the axis of rotation 334.

Figure 21:
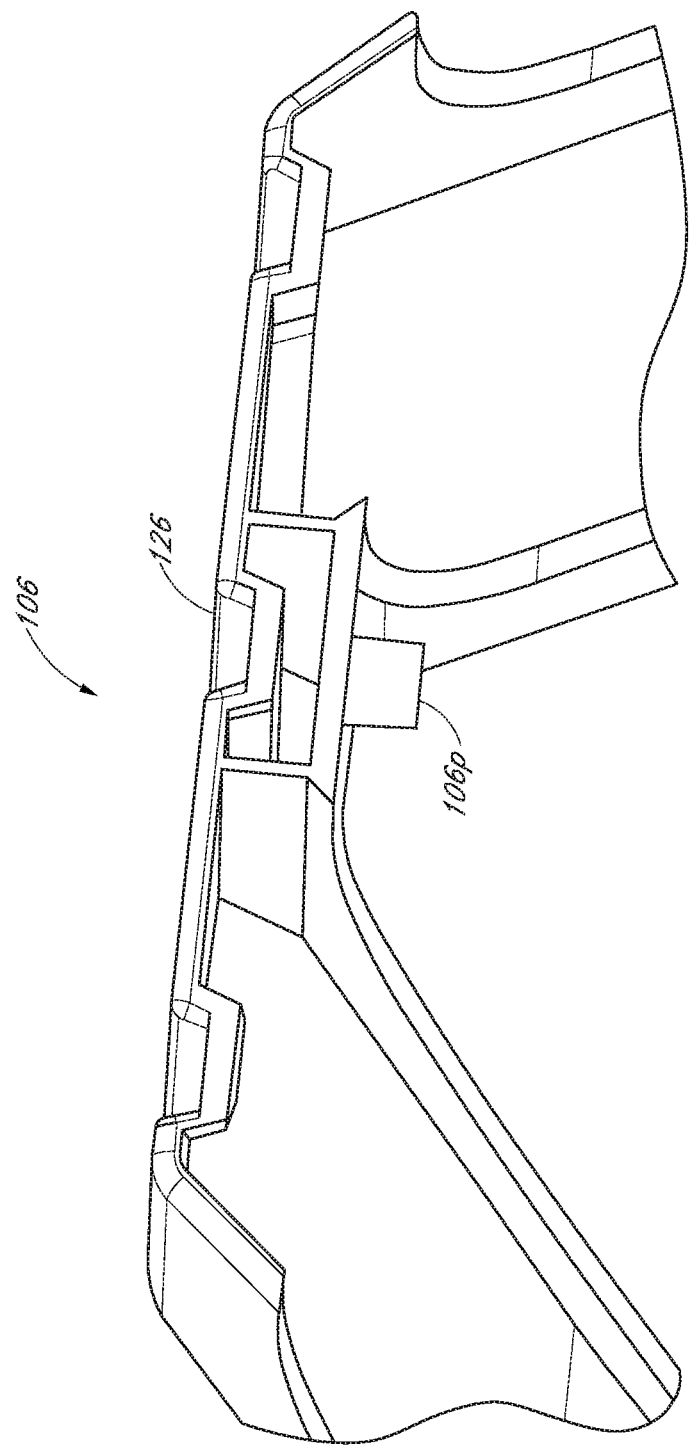
FIG. 21 shows a decorative cover 106 for placement along the support member 102.

FIG. 21 illustrates a decorative cover 106 for placement along the support member 102. The decorative cover can be for aesthetic reasons in order to cover the support member 102 at locations between steps 104. The decorative cover 106 can be similar to the embodiments shown in FIGS. 3A-3D and 6-8. The decorative cover 106 can include a mounting protrusion 106*p*. In embodiments, the mounting protrusion can be cylindrical, to match with a hole in the support member 102 that can be easily created with a cutting tool. Alternatively, other shapes, such as rectangular or triangular cross sections, can be used for the mounting protrusion with corresponding holes in the support member 102. The mounting protrusion can aid in fixation of the decorative cover. The decorative cover can further include geometric features to match the aesthetic style of the first step part 160.

Methods of making, of using, and of assembling the support devices or running boards and their components are understood to be within the scope of the present disclosure.

Although limited embodiments of support devices and assemblies and their components have been specifically described and illustrated herein, many modifications and variations will be apparent to those skilled in the art. For example, the various support devices may incorporate custom paint, have different outer contoured shapes, provided with metallic overcoats, etc. Furthermore, it is understood and contemplated that features specifically discussed for one support device embodiment may be adopted for inclusion with another support device embodiment, provided the functions are compatible. Accordingly, it is to be understood that the support devices and assemblies and their components constructed according to principles of the disclosed device, system, and method may be embodied other than as specifically described herein. The disclosure is also defined in the following claims.

What is claimed is:

1. A support device for facilitating access to a vehicle comprising:
an elongate support member comprising a body with a length having a first end and a second end, a first surface, a second surface, and a third surface;
brackets attached to the elongate support member for mounting the elongate support member to a vehicle;
a step, separate from the brackets, affixed to the elongate support member at a point along the length of the elongate support member, said step comprising a first step part and a second step part;
wherein the second step part is movable along the length of the elongate support member between the first end and the second end of the elongate support member before being affixed at the point along the length;
wherein the first step part is coupled to the second step part and the first and second step parts are rotatable relative to one another after the second step part is fixed from moving along the length of the elongate support member; and
wherein the first step part comprises a step platform comprising a first surface and an opposed second surface and wherein the first surface is exposed for stepping on when the first step part is in a folded over position and the second surface is exposed for stepping on when the first step part is in an extended position.

2. The support device of claim 1, wherein the first step part comprises a step platform attached to a first side leg and a second side leg.

3. The support device of claim 2, wherein the first step part is rotatable to a folded over position so that the step platform is located above the first surface and is rotatable to an extended position so that the step platform is located below the first surface.

4. The support device of claim 1, wherein the second step part comprises a first step hinge and a second step hinge spaced from one another by a hinge spacer.

5. The support device of claim 4, further comprising a spring biasing the first step hinge and the second step hinge towards one another or away from one another.

6. A support device for facilitating access to a vehicle comprising:
an elongate support member comprising a body with a length, a first surface, a second surface, and a third surface;
brackets attached to the elongate support member for mounting the elongate support member to a vehicle;
a step affixed to the elongate support member, said step comprising a first step part and a second step part;
wherein the step is positionable between two spaced apart points along the length of the elongate support member;
wherein the first step part and the second step part are rotatable relative to one another after the step is fastened to the elongate support member;
wherein a dimension between the two spaced apart points is greater than 1 inch;
wherein the first step part comprises a step platform attached to a first side leg and a second side leg; and
wherein the second step part is located between the first side leg and the second side leg.

7. A support device for facilitating access to a vehicle comprising:
an elongate support member comprising a body with a length, a first surface, a second surface, and a third surface;
brackets attached to the elongate support member for mounting the elongate support member to a vehicle;
a step affixed to an elongate extruded support member, said step comprising a first step part and a second step part;

a decorative cover attached to the elongate support member, said decorative cover being positionable along the length of the elongate support member and spaced from the step;

wherein the step is positionable between two spaced apart points along the length of the elongate support member;

wherein the first step part and the second step part are rotatable relative to one another after the step is fastened to the elongate support member;

wherein a dimension between the two spaced apart points is greater than 1 inch.

8. The support device of claim 7, wherein the decorative cover is made from a plastic material.

9. The support device of claim 8, wherein the decorative cover is made by printing using a 3D printer.

10. A support device for facilitating access to a vehicle comprising:
an elongate support member comprising a body with a length, a first surface, a second surface, and a third surface;
brackets attached to the elongate support member for mounting the elongate support member to a vehicle;
a step affixed to an elongate extruded support member, said step comprising a first step part and a second step part;
an end cap attached to an end of the elongate support member, the end cap comprising a recessed area with a surface;
wherein the step is positionable between two spaced apart points along the length of the elongate support member;
wherein the first step part and the second step part are rotatable relative to one another after the step is fastened to the elongate support member;
wherein a dimension between the two spaced apart points is greater than 1 inch; and
wherein a decorative insert is attached to the surface of the recessed area.

11. A method for manufacturing a support device for use to access a vehicle comprising:
obtaining a support member comprising a body with a length, a first surface, a second surface, and a third surface;
attaching brackets to the support member so that the support member can attach to a vehicle through the brackets;
securing a step to the support member by first sliding the step from a first point to a second point along the length of the support member and then securing the step at the second point so that the step is fixed at the second point from moving;
mounting a decorative cover adjacent the step, the decorative cover comprising a body comprising a top leg, an opposed base leg, and two spaced apart side legs; and
wherein the step is rotatable relative to the support member, when at the second point, to move from a first folded position to a second extended position.

12. The method of claim 11, wherein the step comprises a first step part and a second step part, and wherein the first step part is movable relative to the second step part.

13. The method of claim 12, further comprising mounting one or more light elements to the first step part.

14. The method of claim 11, further comprising mounting one or more light elements to the step.

15. A support device to provide a step for access to a vehicle comprising:
a support member attached to the vehicle; the support member comprising an elongate slot defining a bolt galley;
a hinge mount assembly slidably attached to the support member at the elongate slot; and
a step rotatably attached to the hinge mount assembly;
wherein the step is rotatable around an axis of rotation between at least two positions;
wherein the hinge mount assembly comprises a spring that biases the step in a direction along the axis of rotation; and
wherein the support has a top surface and wherein the step comprises a step platform that is rotatable above the top surface and below the top surface when moving between the at least two positions.

16. The support device of claim 15, wherein one of the hinge mount assembly and the step comprises a detent and the other one of the hinge mount assembly and the step comprises a protrusion, the detent and the protrusion being engageable to prevent rotation of the step relative to the hinge mount assembly when the spring is biasing the step.

17. The support device of claim 15, wherein the hinge mount assembly comprises a first step hinge and a second step hinge.

18. The support device of claim 17, wherein the hinge mount assembly further comprises a center hinge spacer located between the first step hinge and the second step hinge.

19. The support device of claim 18, wherein the spring is positioned inside the first step hinge.

20. The support device of claim 18, wherein the step comprises a first mounting lug and a second mounting lug, the first mounting lug coupling with the first step hinge and the second mounting lug coupling with the second step hinge.

21. The support device of claim 20, wherein one of the second mounting lug and the step comprises a detent and the other of the second mounting lug and the step comprises a corresponding protrusion, the detent and the protrusion being engaged to prevent rotation of the step relative to the hinge mount assembly when the spring is biasing the step.

22. The support device of claim 21, wherein the detent and the protrusion are disengaged when the step is moved in an opposite direction along the axis of rotation than the direction of biasing by the spring.

* * * * *